United States Patent
Fujimoto

(10) Patent No.: US 12,322,183 B2
(45) Date of Patent: Jun. 3, 2025

(54) INFORMATION PROCESSING DEVICE FOR IMPROVING WORK PROCESS, INFORMATION PROCESSING METHOD, AND RECORDING MEDIUM

(71) Applicant: OMRON Corporation, Kyoto (JP)

(72) Inventor: Shinya Fujimoto, Kyoto (JP)

(73) Assignee: OMRON Corporation, Kyoto (JP)

( * ) Notice: Subject to any disclaimer, the term of this patent is extended or adjusted under 35 U.S.C. 154(b) by 345 days.

(21) Appl. No.: 17/609,789

(22) PCT Filed: Feb. 26, 2020

(86) PCT No.: PCT/JP2020/007816
§ 371 (c)(1),
(2) Date: Nov. 9, 2021

(87) PCT Pub. No.: WO2020/250498
PCT Pub. Date: Dec. 17, 2020

(65) Prior Publication Data
US 2022/0230440 A1    Jul. 21, 2022

(30) Foreign Application Priority Data

Jun. 14, 2019  (JP) ................. 2019-111038

(51) Int. Cl.
  *G06V 20/52*   (2022.01)
  *G06Q 10/0631*  (2023.01)
(52) U.S. Cl.
  CPC ..... *G06V 20/52* (2022.01); *G06Q 10/063114* (2013.01); *G06V 2201/07* (2022.01)

(58) Field of Classification Search
  CPC ............... G06V 20/52; G06V 2201/07; G06Q 10/063114; G06Q 10/06; G06Q 10/0633; G06Q 10/103; G05B 19/418; G05B 2219/31449; G05B 2219/31467; G05B 2219/32015; H04N 7/183; H04N 7/181; H04N 7/18; G06T 2207/10016;
  (Continued)

(56) References Cited

U.S. PATENT DOCUMENTS 5,974,391 A * 10/1999 Hongawa ......... G06Q 10/06312
                                                 707/999.1
2021/0117693 A1 * 4/2021 Martin .................... G06T 7/246

FOREIGN PATENT DOCUMENTS

| CN | 1945476 | 4/2007 |
|---|---|---|
| CN | 105103068 | 11/2015 |
| CN | 109840672 | 6/2019 |

(Continued)

OTHER PUBLICATIONS

JP-2006221410-A Original and English Translation (Year: 2006).*
(Continued)

*Primary Examiner* — Sumati Lefkowitz
*Assistant Examiner* — Aaron Joseph Sorrin
(74) *Attorney, Agent, or Firm* — JCIPRNET

(57) ABSTRACT

The present invention ascertains the correspondence between the actual operation of an apparatus used to execute a work process and work performed by a worker while suppressing costs. This information processing device associates basic imaging data obtained by capturing the entire work site (WS) by one ceiling camera with process information acquired from a programmable logic controller (PLC).

5 Claims, 8 Drawing Sheets

(58) Field of Classification Search
CPC ........... G06T 2207/30232; G06T 7/246; G06T 2207/30196
See application file for complete search history.

(56) References Cited

FOREIGN PATENT DOCUMENTS

| | | | | |
|---|---|---|---|---|
| DE | 102018129529 A1 * | 5/2019 | ............ | G06N 20/00 |
| JP | 2006221410 | 8/2006 | | |
| JP | 2006221410 A * | 8/2006 | | |
| JP | 2007323199 | 12/2007 | | |
| JP | 2008225704 | 9/2008 | | |
| JP | 2010028562 | 2/2010 | | |
| JP | 2012150613 A * | 8/2012 | | |
| JP | 2014044619 | 3/2014 | | |
| JP | 2017005383 | 1/2017 | | |
| JP | 2017010277 | 1/2017 | | |
| JP | 2017068428 | 4/2017 | | |
| JP | 2018116325 | 7/2018 | | |
| JP | 6365906 B1 * | 8/2018 | ............ | G01B 11/00 |
| JP | 2018142058 A * | 9/2018 | | |
| JP | 2018142259 | 9/2018 | | |
| JP | 2019016226 | 1/2019 | | |
| JP | 2019023803 | 2/2019 | | |
| JP | 2019101516 | 6/2019 | | |
| JP | 2019191748 | 10/2019 | | |
| WO | WO-2020039559 A1 * | 2/2020 | ......... | G06K 9/00335 |

OTHER PUBLICATIONS

JP-6365906-B1 Original and English Translation (Year: 2018).*
JP-2018142058-A Original and English Translation (Year: 2018).*
WO-2020039559-A1 Original and English Translation (Year: 2020).*
JP-2012150613-A Original and English Translation (Year: 2012).*
DE-102018129529-A1 Original and English Translation (Year: 2019).*
"Search Report of Europe Counterpart Application", issued on May 19, 2023, p. 1-p. 8.
"International Search Report (Form PCT/ISA/210) of PCT/JP2020/007816," mailed on May 19, 2020, with English translation thereof, pp. 1-4.
"Written Opinion of the International Searching Authority (Form PCT/ISA/237) of PCT/JP2020/007816," mailed on May 19, 2020, with English translation thereof, pp. 1-10.
Office Action of China Counterpart Application, with English translation thereof, issued on Sep. 5, 2023, pp. 1-22.
Office Action of Japan Counterpart Application, with English translation thereof, issued on Jan. 31, 2023, pp. 1-7.
"Office Action of China Counterpart Application", issued on Jan. 18, 2024, with English translation thereof, pp. 1-31.
"Office Action of Korea Counterpart Application", issued on May 16, 2024, with English translation thereof, pp. 1-11.

* cited by examiner

INFORMATION PROCESSING DEVICE FOR IMPROVING WORK PROCESS, INFORMATION PROCESSING METHOD, AND RECORDING MEDIUM

CROSS-REFERENCE TO RELATED APPLICATION

This application is a 371 application of the International PCT application serial no. PCT/JP2020/007816, filed on Feb. 26, 2020, which claims the priority benefits of Japan Patent Application No. 2019-111038, filed on Jun. 14, 2019. The entirety of each of the above-mentioned patent applications is hereby incorporated by reference herein and made a part of this specification.

TECHNICAL FIELD

The present invention relates to an information processing device and the like that generate data that can be used for improving a work process or the like from imaging data obtained by imaging execution statuses of a plurality of work processes.

BACKGROUND ART

In the related art, there an attempt to use imaging data obtained by imaging an execution status of a work process at a production site such as a factory for improvement of the work process is known. For example, Patent Literature 1 below discloses a technique in which an actual work time that is the time over which a worker was able to actually execute the work is detected by analyzing work video data captured by a plurality of cameras disposed at a work site, and a work process that is a bottleneck is specified by using the detected actual work time.

CITATION LIST

Patent Literature

Patent Literature 1

Japanese Patent Laid-Open No. 2019-23803

SUMMARY OF INVENTION

Technical Problem

However, since the above-described related art requires a plurality of cameras for monitoring a work status of a worker, there is a problem in that the introduction cost when actually applying the cameras to an existing production site or the like is high.

One aspect of the present invention has been made in view of the above-described problem, and an objective thereof is to ascertain a correspondence between an actual operation of an apparatus used to execute a work process and work performed by a worker while curbing realization cost thereof.

Solution to Problem

In order to solve the above problem, according to an aspect of the present invention, there is provided an information processing device including a first acquisition part that acquires imaging data obtained by a single wide-area imaging camera imaging an entire work site including a plurality of monitoring regions respectively associated with a plurality of work processes; a worker determination part that determines whether a worker is present in each of the plurality of monitoring regions through image analysis for the imaging data acquired by the first acquisition part; a second acquisition part that acquires process information generated from operation results indicating details and results of an operation executed by an apparatus used to execute each of the plurality of work processes; an apparatus determination part that determines whether the apparatus is operating by using the process information acquired by the second acquisition part; and a generation part that generates, for each of the plurality of work processes, data in which (A) a time period during which the apparatus used to execute the work process is determined as being operating by the apparatus determination part is associated with (B) a time period during which the worker is determined as being present in the monitoring region associated with the work process by the worker determination part.

In order to solve the above problem, according to an aspect of the present invention, there is provided a control method for an information processing device, the method including a first acquisition step of acquiring imaging data obtained by a single wide-area imaging camera imaging an entire work site including a plurality of monitoring regions respectively associated with a plurality of work processes; a worker determination step of determining whether a worker is present in each of the plurality of monitoring regions through image analysis for the imaging data acquired in the first acquisition step; a second acquisition step of acquiring process information generated from operation results indicating details and results of an operation executed by an apparatus used to execute each of the plurality of work processes; an apparatus determination step of determining whether the apparatus is operating by using the process information acquired in the second acquisition step; and a generation step of generating, for each of the plurality of work processes, data in which (A) a time period during which the apparatus used to execute the work process is determined as being operating in the apparatus determination step is associated with (B) a time period during which the worker is determined as being present in the monitoring region associated with the work process in the worker determination step.

ADVANTAGEOUS EFFECTS OF INVENTION

According to one aspect of the present invention, it is possible to achieve an effect that a correspondence between an actual operation of an apparatus used to execute a work process and work performed by a worker can be ascertained while suppressing realization cost.

DESCRIPTION OF EMBODIMENTS

Embodiment 1

Figure 1:
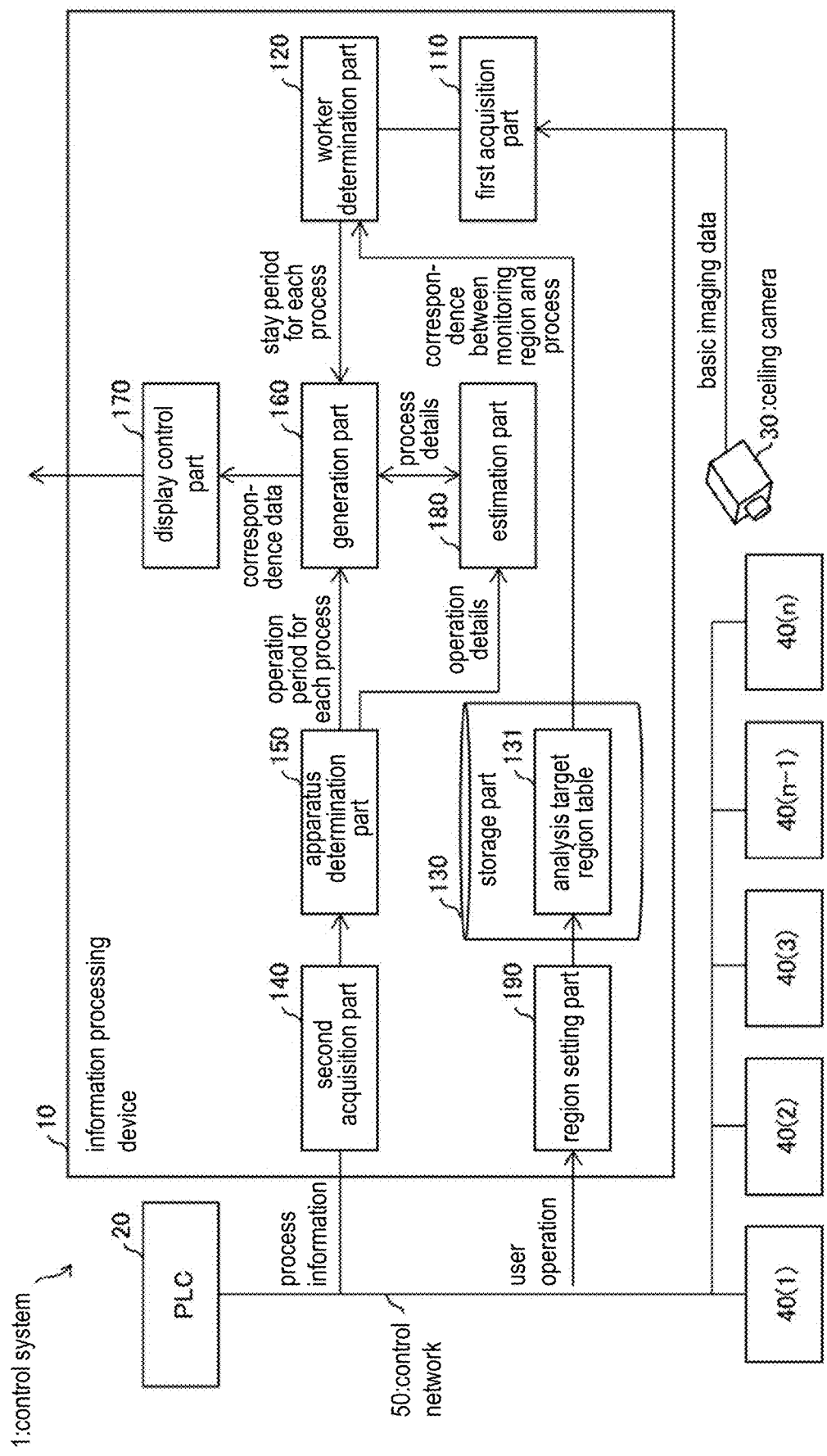
FIG. 1 is a block diagram illustrating configurations of main parts of an information processing device or the like according to Embodiment 1 of the present invention.

Hereinafter, an embodiment according to one aspect of the present invention (hereinafter, also referred to as the "present embodiment") will be described with reference to FIGS. 1 to 9. The same or corresponding portions in the drawings are given the same reference numerals, and the description thereof will not be repeated. In the present embodiment, for example, an information processing device 10 will be described as a typical example of an information processing device. For better understanding of the information processing device 10 according to one aspect of the present invention, first, an outline of a control system 1 and the like including the information processing device 10 will be described with reference to FIG. 2. In the following description, "n" indicates an "integer of 1 or greater", and "m" indicates an "integer of 1 or greater and n or smaller".

1. APPLICATION EXAMPLE (Work Site and Work Process)

Figure 2:
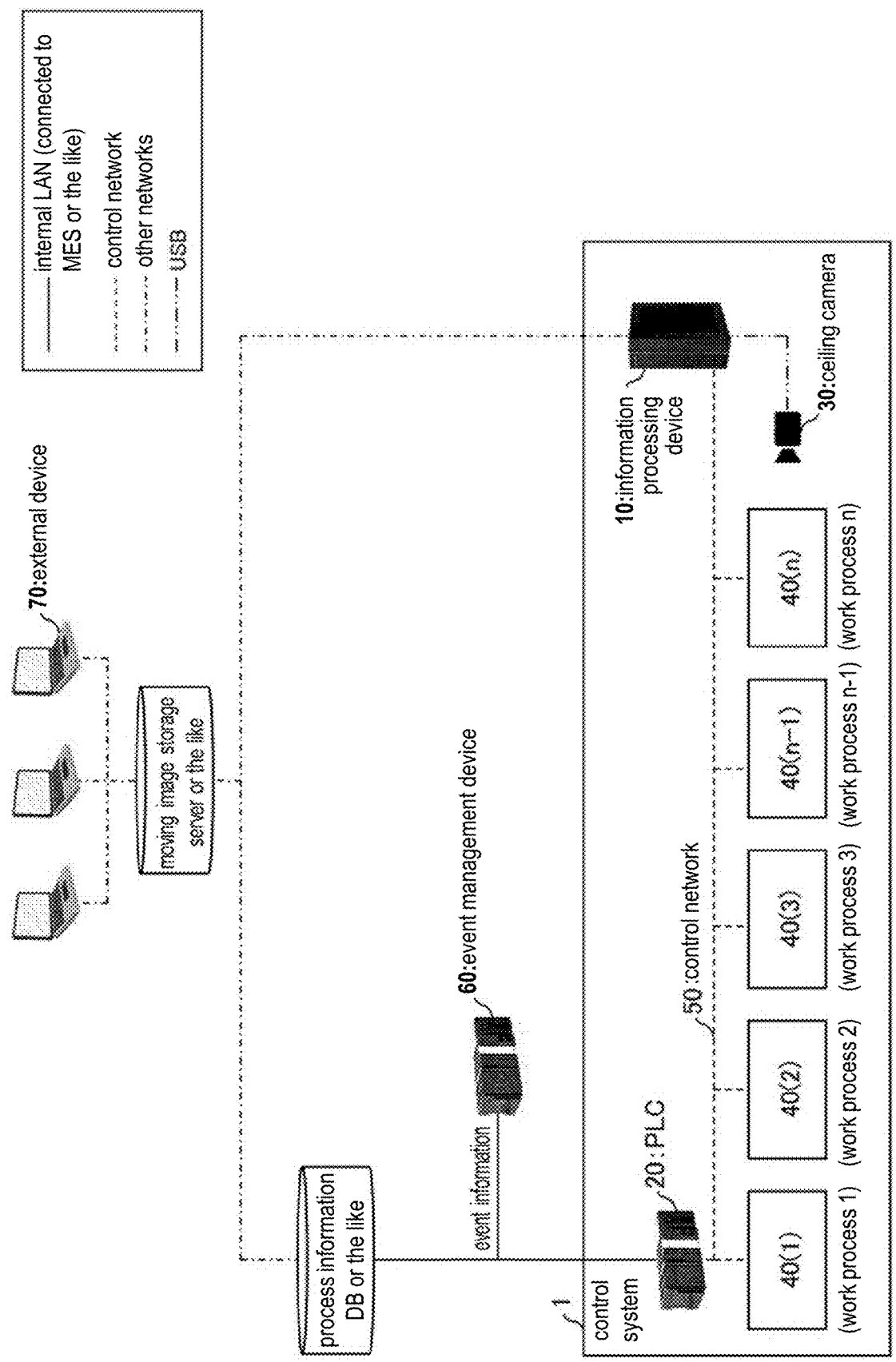
FIG. 2 is a diagram illustrating an overall outline of a control system and the like including the information processing device in FIG. 1.

FIG. 2 is a diagram illustrating an overall outline of the control system 1 and the like including the information processing device 10. A ceiling camera 30 illustrated in FIG. 2 is installed on a ceiling of a work site WS and generates basic imaging data BI which is imaging data obtained by imaging the entire work site WS.

The work site WS is a production site such as a factory, and in the work site WS, for example, various products are produced through a plurality of work processes Pr(1), Pr(2), Pr(3), . . . , and Pr(n). Each of the plurality of work processes Pr(1), Pr(2), Pr(3), . . . , and Pr(n) executed at the work site WS is, for example, any of a "painting" process, a "main workpiece assembly" process, a process of "incorporating a main workpiece into a main body", and an "inspection" process.

Regarding the work processes Pr, in a case where it is necessary to differentiate the plurality of respective work processes Pr from each other, suffixes such as "(1)", "(2)", "(3)", . . . , and "(n)" are added for differentiation. For example, a "work process Pr(1)", a "work process Pr(2)", a "work process Pr(3)", . . . , and a "work process Pr(n)" may be referred to such that they are differentiated. In a case where it is not necessary to differentiate the plurality of respective work processes Pr from each other, they are simply referred to as a "work process Pr".

(Monitoring Region)

The work site WS includes a plurality of monitoring regions Ar(1), Ar(2), Ar(3), . . . , and Ar(n). The plurality of monitoring regions Ar(1), Ar(2), Ar(3), . . . , and Ar(n) is respectively associated with the plurality of work processes Pr(1), Pr(2), Pr(3), . . . , and Pr(n). That is, the monitoring region Ar(m) is a region in which a worker Pe executes work Op(m) related to execution of the work process Pr(m), and is a region in which, for example, an apparatus 40(*m*) is disposed. For example, the worker Pe executes the work Op(m) related to the work process Pr(m) in the monitoring region Ar(m) by using the apparatus 40(*m*).

Similar to the work process Pr, in a case where it is necessary to differentiate the plurality of respective monitoring regions Ar from each other, suffixes such as "(1)", "(2)", "(3)", . . . , and "(n)" are added for differentiation, and in a case where it is not necessary to differentiate the monitoring regions Ar, they are simply referred to as a "monitoring region Ar".

(Basic Imaging Data)

A single ceiling camera 30 that is a wide-area imaging camera is installed on the ceiling of the work site WS. However, it is not essential that the ceiling camera 30 is installed on the ceiling of the work site WS, and the ceiling camera 30 may be installed at a position where the entire work site WS can be overlooked. The ceiling camera 30 generates basic imaging data BI that is imaging data obtained by overlooking the entire work site WS and imaging the entire work site WS. A plurality of analysis target regions Aa(1), Aa(2), Aa(3), . . . , and Aa(n) respectively corresponding to the plurality of monitoring regions Ar(1), Ar(2), Ar(3), . . . , and Ar(n) is set in the basic imaging data BI in advance.

Similar to the monitoring region Ar, in a case where it is necessary to differentiate the plurality of respective analysis target regions Aa from each other, suffixes such as "(1)", "(2)", "(3)", . . . , and "(n)" are added for differentiation, and in a case where it is not necessary to differentiate the analysis target regions Aa, they are simply referred to as an "analysis target region Aa".

The analysis target region Aa is a target region in which the information processing device 10 executes image analysis for the basic imaging data BI. By setting the analysis target region Aa in the basic imaging data BI, it is possible to efficiently execute the image analysis for the basic imaging data BI for recognizing a status of the monitoring region Ar. However, it is not essential to set the analysis target region Aa in the basic imaging data BI. The analysis target region Aa may be set in the basic imaging data BI by the information processing device 10 according to a user operation.

(Work and Workers)

When each of the plurality of work processes Pr(1), Pr(2), Pr(3), . . . , and Pr(n) is executed, each of a plurality of pieces of work Op(1), Op(2), Op(3), . . . , and Op(n) is executed by the worker Pe. The plurality of work processes Pr(1), Pr(2), Pr(3), . . . , and Pr(n) is respectively associated in advance with a plurality of pieces of standard work Op(1), Op(2), Op(3), . . . , and Op(n). However, among the pieces of work Op executed by the worker Pe, there may be the work Op other than the "standard work Op previously associated with the work process Pr", that is, non-standard work Op that cannot be associated with the work process Pr in advance. In a case where it is necessary to differentiate the plurality of respective pieces of work Op from each other, suffixes such as "(1)", "(2)", "(3)", . . . , and "(n)" are added for differentiation, and in a case where it is not necessary to differentiate the respective pieces of work Op, they are simply referred to as "work Op".

At the work site WS, for example, there is one or more workers Pe who execute the work Op(m) related to execution of the work process Pr(m), and the workers Pe are identified by worker IDs attached to crowns of hats worn by the workers Pe. Specifically, the worker Pe(1) and the worker Pe(2) present at the work site WS are respectively identified by the worker ID: Pe(1) attached to the hat worn by the worker Pe(1) and the worker ID: Pe(2) attached to the hat worn by the worker Pe(2). In a case where it is necessary to differentiate a plurality of respective workers Pe from each other, suffixes such as "(1)", "(2)", "(3)", . . . , and "(n)" are added for differentiation, and in a case where it is not necessary to differentiate the workers Pe, they are simply referred to as a "worker Pe".

Figure 3:
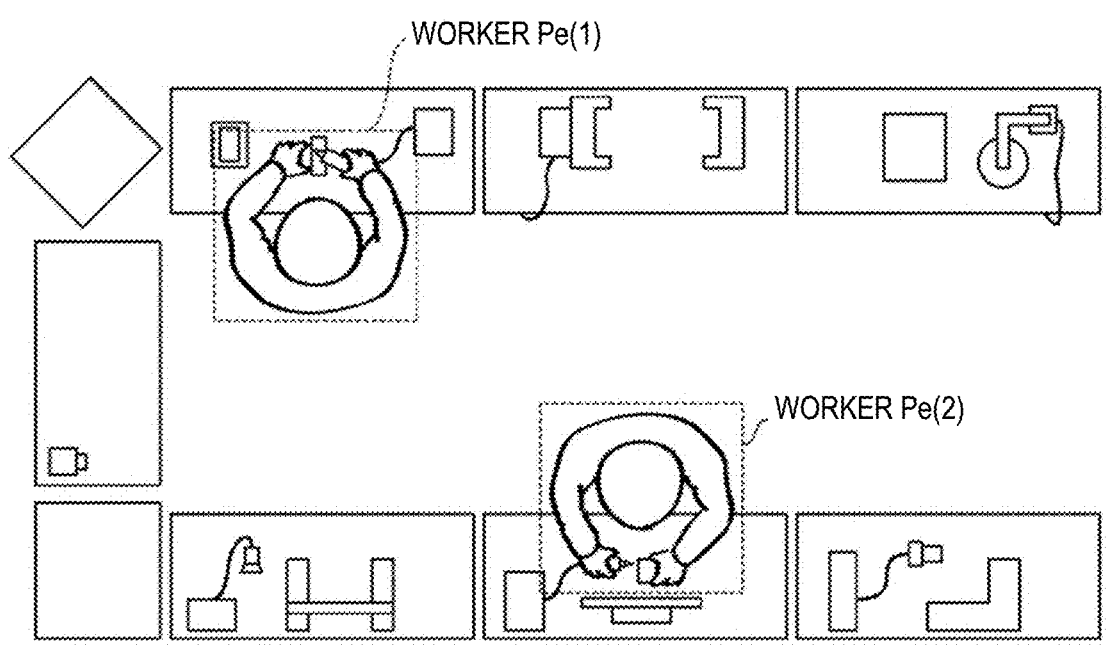
FIG. 3 is a diagram illustrating an image of basic imaging data acquired by the information processing device in FIG. 1.

FIG. 3 is a diagram illustrating an image of the basic imaging data BI acquired by the information processing device 10 from the ceiling camera 30. As illustrated in FIG. 3, the information processing device 10 executes image analysis for the basic imaging data BI, determines whether the worker Pe is present at the work site WS, and if it is determined that the worker Pe is present at the work site WS, specifies a worker ID of the worker Pe present at the work site WS.

(Operation and Apparatus)

When each of the plurality of work processes Pr(1), Pr(2), Pr(3), . . . , and Pr(n) is executed, a plurality of operations Ac(1), Ac(2), Ac(3), . . . , and Ac(n) is respectively executed by the apparatuses 40. That is, the plurality of work processes Pr(1), Pr(2), Pr(3), . . . , and Pr(n) is respectively associated with the plurality of operations Ac(1), Ac(2), Ac(3), . . . , and Ac(n). In a case where it is necessary to differentiate the plurality of respective operations Ac from each other, suffixes such as "(1)", "(2)", "(3)", . . . , and "(n)" are added for differentiation, and in a case where it is not necessary to differentiate the operations Ac, they are simply referred to as an "operation Ac".

The plurality of apparatuses 40 is respectively used for execution of the plurality of work processes Pr, that is, the work process Pr and the apparatus 40 are associated with each other in advance. For example, one or more apparatuses 40(m) are used to execute the work process Pr(m). That is, one or more apparatuses 40(1) are used to execute the work process Pr(1), specifically, three apparatuses 40(1) including the apparatuses 40(1-1), 40(1-2), and 40(1-3) may be used. Similarly, one or more apparatuses 40(2) are used to execute the work process Pr(2), and one or more apparatuses 40(3) are used to execute the work process Pr(3). In a case where it is necessary to differentiate the plurality of apparatuses 40 respectively associated with the plurality of work processes Pr from each other, suffixes such as "(1)", "(2)", "(3)", . . . , "(n)" are added for differentiation, and in a case where it is not necessary to differentiate the apparatuses 40, they are simply referred to as an "apparatus 40".

Here, a single apparatus 40 may be used to execute a plurality of work processes Pr. This may be paraphrased as follows assuming that the variables "p", "q", "x", and "y" each indicate an "integer of 1 or greater", "q" is different from "p", and "y" is different from "x". That is, the apparatus 40 (p-x) used to execute the work process Pr(p) and the apparatus 40 (q-y) used to execute the work process Pr(q) may be the same apparatus 40.

(Master-Slave Control System)

The plurality of apparatuses 40 used to execute the plurality of work processes Pr at the work site WS is controlled by a programmable logic controller (PLC) 20 as a line controller. That is, the control system 1 is constructed as a master-slave control system in which the PLC 20 is used as a master and each of the plurality of apparatuses 40 is used as a slave, and each of the plurality of apparatuses 40 is communicatively connected to the PLC 20 via a network (control network 50). The PLC 20 is called a "master" in the sense that it manages data transfer via the control network 50. The "master" and the "slave" are defined by noting a control function for the data transfer on the control network 50, and what kind of information is transmitted and received between devices is not particularly limited.

The PLC 20 is a control device (controller) that controls the entire control system 1, and is communicatively connected to each of the plurality of apparatuses 40. The PLC 20 acquires information as input data from each of the plurality of apparatuses 40 as input devices (measurement devices). The PLC 20 executes a calculation process using the acquired input data according to a user program incorporated in advance. The PLC 20 executes the calculation process to determine control details for the control system 1, for example, determines control details for each of the plurality of apparatuses 40 as output devices such as actuators, and outputs control data corresponding to the control details to each of the plurality of apparatuses 40. The PLC 20 repeatedly executes acquisition of input data from each of the plurality of apparatuses 40 and acquisition of control data for each of the plurality of apparatuses 40 in a predetermined cycle (control cycle). For example, a display part and an operation part (not illustrated) may be connected to the PLC 20. The display part is configured with a liquid crystal panel or the like capable of displaying an image, and the operation part is typically configured with a touch panel, a keyboard, a mouse, or the like.

The apparatus 40 is a slave in the control system 1 that is a master-slave control system having the PLC 20 as a master. The apparatus 40 is an input device that repeatedly transmits input data to the PLC 20 in every predetermined control cycle, or is an output device that repeatedly receives control data from the PLC 20 in every predetermined control cycle and is operated according to the received control data. The apparatus 40 may be, for example, a sensor (for example, a photoelectric sensor) as an input device that transmits a detection result or the like to the PLC 20 as input data, a barcode reader that transmits a reading result, or an inspection machine (tester) that transmits an inspection result. The apparatus 40 may be a programmable terminal (PT) to which a plurality of input devices is connected. The apparatus 40 may be a robot or the like as an output device that executes screw tightening, picking, and the like.

The control network 50 transfers various data received by the PLC 20 or transmitted by the PLC 20, and may be referred to as a field network because various types of industrial Ethernet (registered trademark) can be typically used. As industrial Ethernet (registered trademark), for example, EtherCAT (registered trademark), Profile IRT, MECHATROLINK (registered trademark)-III, Powerlink, SERCOS (registered trademark)-III, CIP Motion and the like are known, and any of these may be employed. A field network other than industrial Ethernet (registered trademark) may be used. For example, in a case where motion control is not executed, DeviceNet, CompoNet/IP (registered trademark), or the like may be used.

In the following description, the control system 1 in which data is transmitted and received between the PLC 20 (master) and the apparatus 40 (slave) by sequentially transferring data frames on the control network 50 will be described. That is, data frames are sequentially transferred on the control network 50 in a predetermined control cycle, and thus data is repeatedly transmitted and received between the PLC 20 and the apparatus 40 in every control cycle. Data may be transmitted and received between a plurality of apparatuses 40, that is, between a plurality of slaves by sequentially transferring data frames on the control network 50.

(Process Information)

In the control system 1 that is a master-slave control system in which the apparatus 40 is a slave, the PLC 20 that is a master repeatedly receives operation results La indicating details and results of the operation Ac executed by the apparatus 40 from the slave apparatus 40, for example, in every predetermined control cycle. That is, the apparatus 40 repeatedly transmits the operation results La indicating the details and the results of the operation Ac actually executed when the work process Pr is executed to the PLC 20 in a predetermined cycle. For example, the apparatus 40(m) repeatedly transmits the operation results La (m) indicating details and results of the operation Ac(m) executed when the work process Pr(m) is executed to the PLC 20 in a control cycle.

The PLC 20 acquires, for example, a measurement result that is results of a measurement operation executed by the apparatus 40 as an input device (measurement device) as operation results La of the apparatus 40. In a case where the apparatus 40 is an inspection machine, the PLC 20 acquires results of an inspection operation executed by the apparatus 40, for example, an inspection result such as "satisfies or does not satisfy an inspection criterion" as the operation results La of the apparatus 40. The PLC 20 acquires, for example, results of an output operation executed by the apparatus 40 as an output device as the operation results La of the apparatus 40. In a case where the apparatus 40 is a robot that executes screw tightening, picking, or the like, the PLC 20 acquires operation results La such as the number of times of screw tightening or a picking result (picking success or picking error) as the operation results La of the apparatus 40.

The PLC 20 repeatedly receives the operation results La indicating the details and the results of the operation Ac actually executed by the apparatus 40 when the work process Pr is executed from the apparatus 40 in a predetermined cycle, and transmits (that is, transfers) the received operation result La as process information to the information processing device 10. The PLC 20 transmits information generated by using the operation results La repeatedly received from the apparatus 40 in a predetermined cycle to the information processing device 10 as the process information.

The PLC 20 may transmit the operation results La repeatedly received from the apparatus 40 in a predetermined cycle to the outside of the control system 1 as the process information. For example, the PLC 20 may transmit the operation results La repeatedly received from the apparatus 40 in a predetermined cycle to an internal local area network (LAN) illustrated in FIG. 2, connected to a manufacturing execution system (IVIES) or the like as the process information.

In the following description, a description will be made of an example in which the information processing device 10 that has received the process information from the PLC 20 calculates an operation period Da of the operation Ac executed by the apparatus 40 by using the operation results La included in the process information, and determines whether the operation Ac is an "automated operation". As will be described later in detail, in the example described below, the information processing device 10 calculates an operation start time Tms, an operation completion time Tme, and an operation period Da of the operation Ac executed by the apparatus 40 when the work process Pr is executed, from the process information, in particular, from the operation results La. The information processing device 10 determines whether the operation Ac executed by the apparatus 40 at the time of executing the work process Pr is an "automated operation" from the process information, in particular, from the operation results La. A process of calculating the operation period Da of the operation Ac executed by the apparatus 40 at the time of executing the work process Pr and determining whether the operation Ac is an "automated operation" by using the process information (particularly, the operation results La) will also be hereinafter referred to as an "apparatus determination process". In the following description, an example in which the information processing device 10 that has received the process information from the PLC 20 executes the "apparatus determination process" will be described.

However, the "apparatus determination process" may be executed by the PLC 20, and the PLC 20 may cause a result of the "apparatus determination process" to be included in the process information or instead of the process information and transmit the result to the information processing device 10.

In the above description, the operation start time Tms is a time point at which the apparatus 40 used for the work process Pr starts execution of the operation Ac when the work process Pr is executed, and the operation completion time Tme is a time point at which the execution of the operation Ac is completed. The operation period Da is a period from the operation start time Tms to the operation completion time Tme.

(System and Device Other than Master-Slave Control System)

As illustrated in FIG. 2, an internal LAN system may be connected to the control system 1 as a master-slave control system. The internal LAN is connected to a process information database (DB) that is also called an MES. The process information DB stores information indicating "a standard operation to be executed by the apparatus 40 used to execute the work process Pr".

Although not illustrated in FIG. 2, the information processing device 10 may be connected to the process information DB via, for example, an internal LAN, and the information processing device 10 may acquire information indicating "a standard operation to be executed by the apparatus 40 used to execute the work process Pr" from the process information DB. The information processing device 10 may use the information acquired from the process information DB to execute the "apparatus determination process". However, it is not essential for the information processing device 10 to be connected to the internal LAN or the process information DB.

In the example illustrated in FIG. 2, an event management device 60 that monitors and manages various events that occur at the work site WS is connected to the process information DB as an IVIES via the internal LAN. However, it is not essential that the event management device 60 is connected to the process information DB via the internal LAN, and the event management device 60 does not have to be provided. The PLC 20 is connected to the process information DB via the internal LAN. The PLC 20 may transmit the operation results La or the like acquired from the apparatus 40 to the process information DB via the internal LAN. In addition to the MES, an enterprise resources planning (ERP), a warehouse management system (WMS), or the like (not illustrated) may be connected to the internal LAN.

In FIG. 2, a moving image storage server or the like is connected to the process information DB via "another network" different from the control network 50 and the internal LAN. The information processing device 10 is connected to the moving image storage server or the like via another network, and partial imaging data OD and association information Mi transmitted from the information processing device 10 are stored in the moving image storage server or the like. The partial imaging data OD is imaging data extracted by the information processing device 10 from the basic imaging data BI generated by the ceiling camera 30 imaging the entire work site WS according to a predetermined reference. As will be described later in detail, the association information Mi is information indicating a correspondence between a stay period Do of the worker Pe present in the monitoring region Ar corresponding to the work process Pr and an operation period Da that is a period during which the apparatus 40 has executed the operation Ac corresponding to the work process Pr for each work process Pr.

An external device 70 realized by a personal computer (PC) or the like is further connected to the moving image storage server or the like, and the external device 70 displays, for example, the partial imaging data OD, the association information Mi, and the like, and thus visualizes the process information or the like. That is, the external device 70 displays a list of information necessary for improving the work process Pr, and displays the bottleneck work process Pr, information indicating the date and time of an error that occurred in the work process Pr, and the like in association with the partial imaging data OD. Details of the association information Mi displayed by the external device 70 will be described with reference to FIGS. 6, 7, and 9.

As described above, the ceiling camera 30 images the entire work site WS to generate the basic imaging data BI, and transmits the generated basic imaging data BI to the information processing device 10 via, for example, a communication cable that is a Universal Serial Bus (USB) cable.

The information processing device 10 is an information processing device that is realized by, for example, a PC or the like, and combines the process information acquired from the PLC 20 and the basic imaging data BI acquired from the ceiling camera 30 to enable efficient use of both. The information processing device 10 may be said to be a device that visualizes the process information including "the operation results La indicating details and results of actual operations Ac of a plurality of apparatuses 40 at the work site WS" by combining the process information with the basic imaging data BI.

In the related art, although image analysis may be executed on imaging data obtained by imaging the "work Op performed by the worker Pe at the work site WS", the imaging data is not associated with the process information of a plurality of apparatuses 40 at the work site WS, and the accuracy of estimating the work Op based on the image analysis is low. In the related art of disposing sensors in each of a plurality of work processes Pr to visualize the process information of the apparatus 40, the bottleneck of the work process Pr can be visualized, but it is difficult to ascertain a cause of the bottleneck in association with the work Op performed by the worker Pe. In a case where the imaging data obtained by imaging the "work Op performed by the worker Pe at the work site WS" and the process information of the apparatus 40 are associated with each other by a system higher than the master-slave control system, such a higher system is very large and not easy to realize.

On the other hand, the information processing device 10 acquires the process information including the operation results La indicating details and results of the operation Ac of the apparatus 40 used to execute the work process Pr from the PLC 20, and combines the acquired process information with the basic imaging data BI acquired from the single ceiling camera 30. The information processing device 10 combines the process information including the operation results La indicating the details and the results of the operation Ac of each of the plurality of apparatuses 40 with the basic imaging data BI obtained by imaging the entire work site WS, and can thus execute analysis related to each of the processes Pr efficiently and precisely.

That is, in addition to visualizing the process information, the information processing device 10 extracts, for example, a bottleneck work process Pr, and combines imaging data ID (partial imaging data OD) obtained by imaging an execution status of the extracted work process Pr with process information regarding the extracted work process Pr. Therefore, for example, a user can easily specify a cause of the bottleneck or a cause of a defect in the bottleneck work process Pr, and can thus efficiently execute work of improving the work process Pr. The information processing device 10 can also be used for traceability when a defect occurs.

The information processing device 10 can improve an analysis accuracy for both the analysis for the basic imaging data BI and the analysis for the process information by combining the basic imaging data BI with the process information of each of the plurality of apparatuses 40.

Here, in order to realize the technique of the related art as disclosed in Patent Literature 1 described as the background technique for the information processing device 10, it is necessary to introduce a very expensive apparatus into the entire work site WS. In contrast, the information processing device 10 uses the PLC 20 that has been used in the work site WS for a long time and the single ceiling camera 30 that is installed on the ceiling of the work site WS, and thus the realization cost is low. The information processing device 10 may use the ceiling camera 30 that images only the desired work process Pr (that is, the desired monitoring region Ar), or the ceiling camera 30 used by the information processing device 10 is also easily relocated.

In the technique in Patent Literature 1, a work impossible time that is a time during which a worker could not execute work is calculated by analyzing work video data captured by a plurality of cameras. In the technique in Patent Literature 1, an actual work time during which it was actually possible to work is calculated by subtracting the work impossible time calculated by analyzing the work video data from an apparent work time measured on the basis of a worker's operation on a work instruction terminal that displays a work procedure to the worker. That is, the technique in Patent Literature 1 requires an operation instruction of the worker Pe for the apparatus 40 used to execute the work process Pr, specifically, the work instruction terminal in order to ascertain a correspondence between the actual operation Ac of the apparatus 40 used to execute the work process Pr and the worker Pe.

On the other hand, the information processing device 10 uses the process information, specifically, the operation results La of the apparatus 40 to specify the operation start time Tms at which the apparatus 40 starts the operation Ac and the operation completion time Tme at which the operation Ac is completed. That is, the information processing device 10 specifies the operation start time Tms and the operation completion time Tme of the apparatus 40 without requiring the operation work of the worker Pe for the work instruction terminal that displays the work procedure to the worker Pe.

Specifically, the information processing device 10 is communicatively connected to the PLC 20 via the control network 50 that connects the PLC 20 that is a master to the apparatus 40 that is a slave. The information processing device 10 receives process information including the operation results La indicating details and results of the "actual operation Ac executed by the apparatus 40 used to execute the work process Pr" from the PLC 20. Here, the information processing device 10 needs to be communicatively connected to the PLC 20 via the control network 50, but the information processing device 10 does not have to be a slave in "a master-slave control system in which the PLC 20 is a master and the apparatus 40 is a slave".

The information processing device 10 is communicatively connected to the ceiling camera 30 via, for example, a Universal Serial Bus (USB) cable. The information processing device 10 acquires the basic imaging data BI in which the entire work site WS is imaged from the ceiling camera 30.

The information processing device 10 may acquire an operation reference Sa indicating "a standard operation to be executed by the apparatus 40 used to execute the work process Pr" from the process information DB. The information processing device 10 may be used to execute the "apparatus determination process" by using the acquired operation reference Sa. The information processing device 10 may extract desired partial imaging data OD from the basic imaging data BI by using the acquired operation reference Sa.

Therefore, since the information processing device 10 does not transmit the basic imaging data BI to the internal LAN connected to an IVIES or the like, the communication in the internal LAN is not overwhelmed by the transmission of the basic imaging data BI having a huge amount of data. The information processing device 10 uses the basic imaging data BI acquired from the single ceiling camera 30 for efficient and precise analysis of process information. Therefore, the information processing device 10 allows the user to ascertain a correspondence between the actual operation Ac of the apparatus 40 used to execute the work process Pr and the work Op performed by the worker Pe while suppressing the realization cost.

2. CONFIGURATION EXAMPLE

The outline of the control system 1 and the like has been described hitherto with reference to FIGS. 2 and 3. Prior to description of the details of the information processing device 10 with reference to FIG. 1 and the like, the outline of the information processing device 10 is summarized as follows for better understanding of the information processing device 10.

That is, the information processing device 10 (information processing device) includes a first acquisition part 110 that acquires the basic imaging data BI (imaging data) obtained by imaging the entire work site WS including the plurality of monitoring regions Ar respectively associated with the plurality of work processes Pr with the single ceiling camera 30 (wide-area imaging camera), a worker determination part 120 that determines whether the worker Pe is present in each of the plurality of monitoring regions Ar through image analysis for the basic imaging data BI acquired by the first acquisition part 110, a second acquisition part 140 that acquires process information generated from the operation results La indicating details and results of the operation Ac executed by the apparatus 40 used to execute each of the plurality of work process Pr, an apparatus determination part 150 that determines whether the apparatus 40 is operating by using the process information acquired by the second acquisition part, and a generation part 160 that generates, for each of the plurality of work processes Pr, data (association information Mi) in which (A) a time period (operation period Da) during which the apparatus 40 used to execute the work process Pr is determined as being operating by the apparatus determination part 150 is associated with (B) a time period (stay period Do) during which the worker Pe is determined as being present in the monitoring region Ar associated with the work process Pr by the worker determination part 120.

According to the above configuration, the information processing device 10 determines whether the worker Pe is present in the monitoring region Ar associated with the work process Pr on the basis of the basic imaging data BI captured by the single ceiling camera 30. The information processing device 10 determines whether the apparatus 40 used to execute the work process Pr is operating on the basis of the process information. The information processing device 10 generates the association information Mi in which the operation period Da that is a time period during which the apparatus 40 is determined as being operating is associated with the stay period Do that is a time period during which the worker Pe is determined as being present in the monitoring region Ar associated with the work process Pr for each work process Pr.

That is, the information processing device 10 generates the association information Mi indicating a "correspondence between the operation period Da during which the apparatus 40 is operating and the stay period Do during which the worker Pe is present in the monitoring region Ar" for each work process Pr through image analysis for the basic imaging data BI obtained by the single ceiling camera 30 imaging the entire work site WS.

Therefore, the information processing device 10 can achieve an effect of suppressing the realization cost and also ascertaining a correspondence between an actual operation of the apparatus 40 used for the work process Pr and the worker Pe by using the single ceiling camera 30 capable of imaging the entire work site WS.

The information processing device 10 further includes an estimation part 180 that estimates details of the work Op performed by the worker Pe in the stay period Do during which the worker Pe is determined as being present in the monitoring region Ar associated with the work process Pr by the worker determination part 120, by using the operation results La of the apparatus 40 used to execute the work process Pr.

According to the above configuration, the information processing device 10 estimates details of the work Op performed by the worker Pe in the stay period Do during which the worker Pe is determined as being present in the monitoring region Ar associated with the work process Pr by using the operation results La of the apparatus 40 used to execute the work process Pr.

Therefore, the information processing device 10 can achieve an effect of estimating details of the work Op performed by the worker Pe present in the monitoring region Ar associated with the work process Pr by using the operation results La of the apparatus 40 for each work process Pr.

The information processing device 10 further includes a display control part 170 that generates data in which a Gantt chart indicating the operation period Da during which the apparatus 40 used to execute the work process Pr is determined as being operating by the apparatus determination part 150 and a Gantt chart indicating the stay period Do during which the worker Pe is determined as being present in the monitoring region Ar associated with the work process Pr by the worker determination part 120 are displayable in parallel.

According to the above configuration, the information processing device 10 generates the data in which the Gantt chart indicating the operation period Da during which the apparatus 40 is determined as being operating and the Gantt chart indicating the stay period Do during which the worker Pe is determined as being present in the monitoring region Ar for each work process Pr are displayable in parallel.

Therefore, the information processing device 10 can achieve an effect that a correspondence between the operation period Da of the apparatus 40 and the stay period Do during which the worker Pe is present in the monitoring region Ar for each work process Pr can be displayed to a user such as an administrator in a form that can be ascertained at a glance.

The information processing device 10 further includes a region setting part 190 that sets an analysis target region Aa that is an image analysis target with the monitoring region Ar as an imaged region for the basic imaging data BI according to a user operation.

According to the above configuration, the information processing device 10 sets the analysis target region Aa for the basic imaging data BI according to the user operation. Therefore, the information processing device 10 can achieve an effect that the analysis target region Aa can be set for the basic imaging data BI according to the user operation.

The information processing device 10 of which the outline has been described hitherto will be described next with reference to FIG. 1 for details of its configuration, and then a process executed by the information processing device 10 will be described with reference to FIG. 4.

(Details of Information Processing Device)

FIG. 1 is a block diagram illustrating a main part configuration of the information processing device 10 and the like included in the control system 1. As illustrated in FIG. 1, the information processing device 10 includes, as functional blocks, the first acquisition part 110, the worker determination part 120, the storage part 130, the second acquisition part 140, the apparatus determination part 150, the generation part 160, the display control part 170, the estimation part 180, and the region setting part 190. In addition to the above-described functional blocks, the information processing device 10 may include, for example, a transmission part that transmits the partial imaging data OD extracted from the basic imaging data BI to the outside of the control system 1 (for example, the moving image storage server illustrated in FIG. 2). However, for simplification of the description, a configuration not directly related to the present embodiment is omitted from the description and the block diagram. However, the information processing device 10 may have the omitted configuration in accordance with the actual situation of implementation.

The first acquisition part 110, the worker determination part 120, the second acquisition part 140, the apparatus determination part 150, the generation part 160, the display control part 170, the estimation part 180, and the region setting part 190 may be realized, for example, by a central processing unit (CPU) or the like reading a program stored in a storage device (storage part 130) configured with a read only memory (ROM), a non-volatile random access memory (NVRAM), or the like to a random access memory (RAM) or the like (not illustrated) and executing the program. Hereinafter, first, the first acquisition part 110, the worker determination part 120, the second acquisition part 140, the apparatus determination part 150, the generation part 160, the display control part 170, the estimation part 180, and the region setting part 190 of the information processing device 10 will be described.

The first acquisition part 110 acquires the basic imaging data BI that is imaging data obtained by the ceiling camera 30 imaging the entire work site WS, from the ceiling camera 30, and outputs the acquired basic imaging data BI to the worker determination part 120.

The worker determination part 120 determines whether the worker Pe is present at the work site WS through image analysis for the basic imaging data BI, and if it is determined that the worker Pe is present at the work site WS, further specifies the monitoring region Ar in which the worker Pe is present. That is, the worker determination part 120 refers to an analysis target region table 131 in the storage part 130 to ascertain a correspondence between the monitoring region Ar and the analysis target region Aa. When it is confirmed that the analysis target region Aa(m) includes imaging data of the worker Pe, the worker determination part 120 specifies that a region in which the worker Pe is present is the monitoring region Ar(m) on the basis of the correspondence between the monitoring region Ar and the analysis target region Aa. The worker determination part 120 may specify the number of workers Pe present in each monitoring region Ar.

The worker determination part 120 specifies a worker ID of the worker Pe present in the monitoring region Ar. For example, the worker determination part 120 specifies that the worker ID of the worker Pe(x) present in the monitoring region Ar(m) is a "worker Pe(x)".

The worker determination part 120 calculates the stay period Do of the worker Pe(x) for each work process Pr, that is, for each monitoring region Ar. Specifically, the worker determination part 120 specifies a time point (=stay start time Tos(m)(x)) at which it is confirmed that the worker Pe(x) who was not previously present in the monitoring region Ar(m) is now present in the monitoring region Ar(m). The worker determination part 120 specifies a time point (=stay end time Toe(m)(x)) at which it is confirmed that the worker Pe(x) who was previously present in the monitoring region Ar(m) is not now present in the monitoring region Ar(m). The worker determination part 120 calculates a stay period Do(m)(x) of the worker Pe(x) that is a period from the stay start time Tos(m)(x) to the stay end time Toe (m)(x) with respect to the work process Pr(m), that is, the monitoring region Ar(m).

The worker determination part 120 notifies the generation part 160 of the specified (calculated) stay start time Tos(x), stay end time Toe(x), and stay period Do(x) of the worker Pe(x) for each work process Pr, that is, for each monitoring region Ar.

The worker determination part 120 may execute flow line analysis capable of precisely ascertaining the presence and movement of the worker Pe as the image analysis for the basic imaging data BI, to detect center coordinates of the worker Pe, the worker ID, and the like.

The second acquisition part 140 acquires the process information from the PLC 20 and outputs the acquired process information to the apparatus determination part 150. The process information is ""the operation results La of the apparatus 40" "acquired by the PLC 20 from the apparatus 40"" and "information generated by the PLC 20 by using the acquired "operation result La of the apparatus 40"". That is, the process information includes the operation results La, and the operation results La is information indicating details and results of the operation Ac actually executed by the apparatus 40 when the work process Pr is executed. In a case where the PLC 20 uses the operation results La of the apparatus 40 to calculate the operation period Da of the operation Ac executed by the apparatus 40 and determine whether the operation Ac is an "automated operation", the process information may include information indicating the operation period Da and the determination result.

The apparatus determination part 150 uses the process information acquired from the second acquisition part 140, and in particular, the operation results La of the apparatus 40 to specify the operation start time Tms that is a "time point at which the apparatus 40 used to execute the work process Pr starts to execute the operation Ac". The apparatus determination part 150 uses the process information acquired from the second acquisition part 140, and in particular, the operation results La of the apparatus 40 to specify the operation completion time Tme that is a "time point at which the apparatus 40 used to execute the work process Pr completes the execution of the operation Ac". The apparatus determination part 150 calculates, for example, a time (period) from the operation start time Tms(m) to the operation completion time Tme(m) specified for the operation Ac(m) as the operation period Da(m). The operation period Da(m) is "a period during which the operation Ac(m) is executed by the apparatus 40(m) used to execute the work process Pr(m)". The apparatus determination part 150 notifies the generation part 160 of the operation period Da(m) calculated for the operation Ac(m) corresponding to the work process Pr(m). That is, the apparatus determination part 150 notifies the generation part 160 of the operation period Da of the operation Ac corresponding to the work process Pr for each work process Pr (that is, the operation period Da of the operation Ac actually executed by the apparatus 40 when the work process Pr is executed).

The apparatus determination part 150 uses the process information acquired from the second acquisition part 140, and in particular, the operation results La of the apparatus 40 to determine whether "the operation Ac executed by the apparatus 40 used to execute the work process Pr" is an "automated operation". For example, the apparatus determination part 150 uses the operation results La(m) of the apparatus 40(m) used to execute the work process Pr(m) to determine whether the "operation Ac(m) executed by the apparatus 40(m) when the work process Pr(m) is executed" is an "automated operation". The apparatus determination part 150 notifies the estimation part 180 of the determination result of whether the operation Ac(m) is an "automated operation" as information indicating operation details of the operation Ac(m).

The generation part 160 generates information in which "the stay period Do(x) of the worker Pe(x) for each work process Pr" acquired from the worker determination part 120 is associated with "the operation period Da of the operation Ac corresponding to the work process Pr for each work process Pr" acquired from the apparatus determination part 150. The information in which "the stay period Do(x) of the worker Pe(x) for each work process Pr" is associated with "the operation period Da of the operation Ac corresponding to the work process Pr for each work process Pr" is also referred to as the "association information Mi".

For example, the generation part 160 generates the association information Mi(m) in which "the stay period Do(m)(x) of the worker Pe(x) for the work process Pr(m) (that is, the monitoring region Ar(m))" is associated with "the operation period Da(m) of the operation Ac(m) for the work process Pr(m)". In the "association information Mi", for example, "the stay period Do(x) of the worker Pe(x) for each work process Pr (that is, the monitoring region Ar)" is associated with "the operation period Da of the operation Ac corresponding to the work process Pr for each work process Pr" with a common time axis.

The generation part 160 notifies the display control part 170 of the association information Mi for each generated work process Pr, and for example, notifies the display control part 170 of the association information Mi(m) for the work process Pr(m). The generation part 160 notifies the display control part 170 of the association information Mi for each generated work process Pr, and for example, notifies the estimation part 180 of the association information Mi(m) for the work process Pr(m).

The generation part 160 may add "work details of the work Op performed by the worker Pe in the stay period Do and a determination result of whether the work Op is standard work" reported from the estimation part 180 to the association information Mi generated for each work process Pr. The generation part 160 may notify the display control part 170 of the association information Mi for each work process Pr to which the "work details of the work Op performed by the worker Pe in the stay period Do and the determination result of whether the work Op is standard work" are added.

The display control part 170 arranges the association information Mi and the like generated by the generation part 160 into a data format that can be displayed to a user. The display control part 170 transmits, for example, the association information Mi or the like arranged in a data format that can be displayed to the user to the moving image storage server or the like illustrated in FIG. 2. The display control part 170 may arranged the association information Mi for each work process Pr including "the work details of the work Op and the determination result of whether the work Op is standard work" reported from the generation part 160 into a data format that can be displayed to the user.

The estimation part 180 estimates work details of the "work Op performed by the worker Pe in the stay period Do" by using the association information Mi for each work process Pr reported from the generation part 160, and determines whether the work Op is "standard work". In particular, the estimation part 180 estimates work details of the "work Op performed by the worker Pe in the stay period Do" by using the determination result of "whether the operation Ac(m) is an "automated operation"" reported from the apparatus determination part 150, and determines whether the work Op is "standard work". That is, the estimation part 180 estimates the work details of the work Op by using the association information Mi(m) generated by the generation part 160 and the determination result of "whether the operation Ac(m) is an "automated operation"", and determines whether the work Op is "standard work". The estimation part 180 notifies the generation part 160 of the work details estimated for the work Op and the determination result of whether the work Op is standard work.

The region setting part 190 receives a user operation and updates the information stored in the analysis target region table 131 according to the received user operation.

The storage part 130 is a storage device that stores various data used by the information processing device 10. The storage part 130 may store (1) a control program executed by the information processing device 10, (2) an OS program, (3) an application program for executing various functions of the information processing device 10, and (4) various data to be read in a case where the application program is executed in a non-transitory manner. The above data (1) to (4) are stored in a nonvolatile storage device such as a read only memory (ROM), a flash memory, an erasable programmable ROM (EPROM), an Electrically EPROM (EEPROM) (registered trademark), or a hard disk drive (HDD). The information processing device 10 may include a temporary storage part (not illustrated). The temporary storage part is a so-called working memory that temporarily stores data used for calculation and calculation results in the middle of various processes executed by the information processing device 10, and is configured with a volatile storage device such as a random access memory (RAM). Which data is stored in which storage device is determined as appropriate on the basis of the purpose of use, convenience, cost, physical restrictions, or the like of the information processing device 10. The storage part 130 further stores the analysis target region table 131.

The analysis target region table 131 stores a plurality of analysis target regions Aa respectively corresponding to the plurality of monitoring regions Ar. For example, the analysis target region Aa for checking a status of the monitoring region Ar(m) corresponding to the work process Pr(m) is set for the basic imaging data BI, and the analysis target region table 131 stores the monitoring region Ar(m) associated with the work process Pr(m). Each of the plurality of analysis target regions Aa stored in the analysis target region table 131 is updated by the region setting part 190 according to a user operation.

3. OPERATION EXAMPLE

Figure 4:
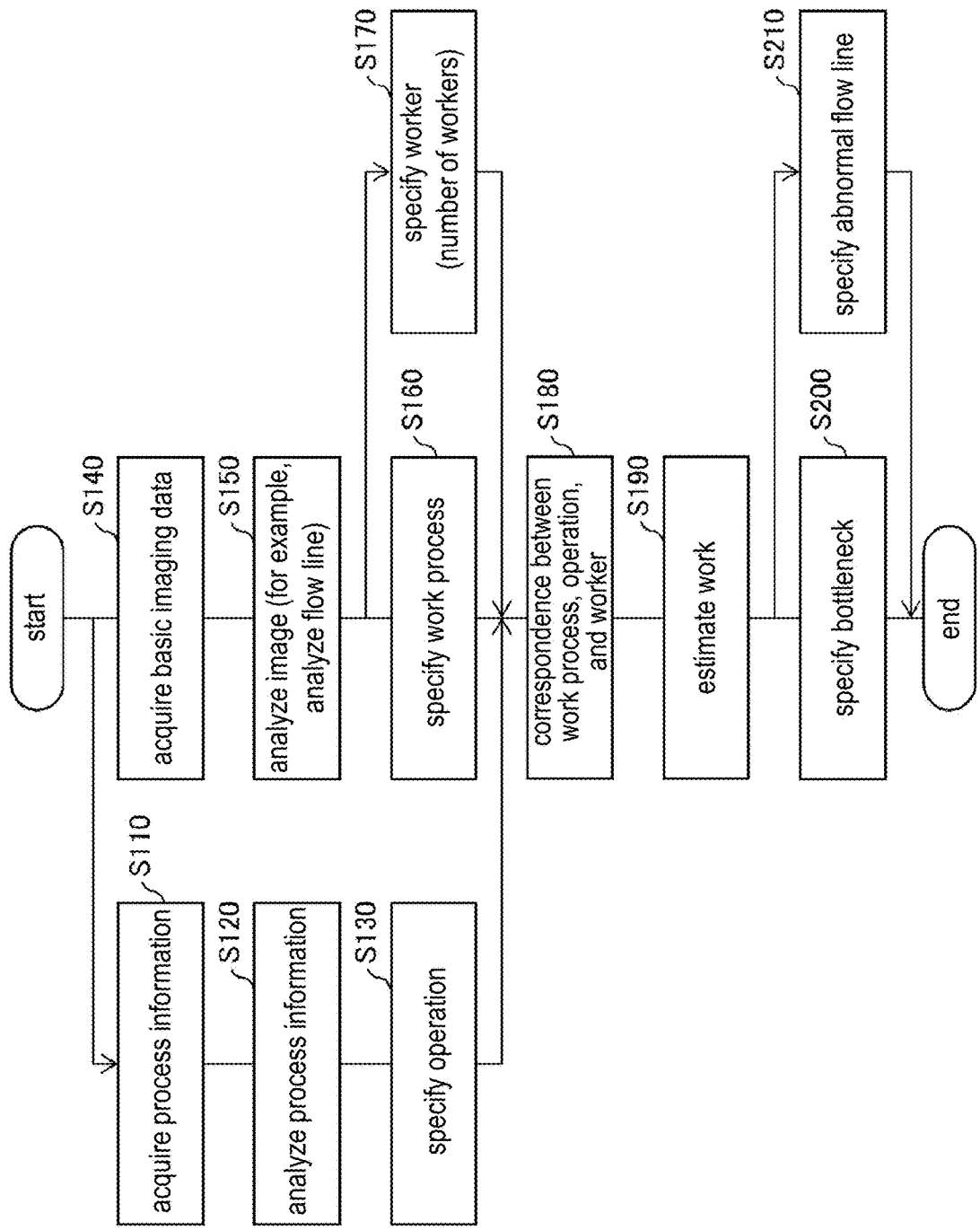
FIG. 4 is a flowchart illustrating an outline of a process executed by the information processing device in FIG. 1.

FIG. 4 is a flowchart illustrating an outline of a process executed by the information processing device 10. The second acquisition part 140 acquires process information including the operation results La that "indicate details and results of the operation Ac actually executed by the apparatus 40 when the work process Pr is executed" from the PLC 20 (S110).

The apparatus determination part 150 analyzes the process information acquired from the second acquisition part 140 (S120), and specifies the operation Ac actually executed by the apparatus 40 when the work process Pr is executed for each work process Pr (S130). The apparatus determination part 150 calculates the operation period Da for the specified operation Ac, and determines whether it is an "automated operation". The apparatus determination part 150 notifies the generation part 160 of the calculated operation period Da of the operation Ac, and notifies the estimation part 180 of a determination result of whether the operation Ac(m) is an "automated operation" as information indicating the operation details of the operation Ac(m).

The first acquisition part 110 acquires the basic imaging data BI obtained by imaging the entire work site WS from the single ceiling camera 30 installed on the ceiling of the work site WS (S140). The worker determination part 120 executes image analysis for the basic imaging data BI, and executes, for example, flow line analysis (S150).

The worker determination part 120 specifies the work process Pr(m) corresponding to the monitoring region Ar(m) in which the worker Pe is determined as being present through the image analysis (S160), and specifies a worker ID of the worker Pe present in the monitoring region Ar(m) (S170). The worker determination part 120 further specifies the number of workers Pe present at the work site WS, and in particular, may specify the number of workers Pe present in each analysis target region Aa, that is, in each monitoring region Ar. The worker determination part 120 notifies the generation part 160 of the specified (calculated) stay period Do(x) of the worker Pe(x) for each work process Pr, that is, for each monitoring region Ar.

The generation part 160 generates the association information Mi in which the work process Pr, the operation Ac, and the worker Pe are associated with each other (S180). Specifically, the generation part 160 generates the association information Mi(m) in which "the stay period Do(m)(x) of the worker Pe(x) for the work process Pr(m) (that is, the monitoring region Ar(m))" acquired from the worker determination part 120 is associated with "the operation period Da(m) of the operation Ac(m) for the work process Pr(m)" acquired from the apparatus determination part 150.

The generation part 160 notifies the estimation part 180 of "the association information Mi(m) between the stay period Do(m)(x) of the worker Pe(x) and the operation period Da(m) of the operation Ac(m) for the work process Pr(m)" generated in S180.

The estimation part 180 estimates work details of the work Op(m) executed in the stay period Do(m) on the basis of the association information Mi(m) generated by the generation part 160 and the determination result of "whether the operation Ac(m) is an "automated operation"" from the apparatus determination part 150 (S190). The estimation part 180 determines whether the work Op(m) of which the work details are estimated is standard work, specifies, for example, the work process Pr that is a bottleneck (S200), and also specifies an abnormal flow line in the basic imaging data BI (S210). That is, the estimation part 180 notifies a user that the work process Pr(m) corresponding to the work Op(m) determined as not being the standard work may be a bottleneck. The estimation part 180 notifies the user that a movement (flow line) of the worker Pe who has executed the work Op(m) determined as not being standard work may be different (that is, abnormal) from a normal movement (flow line) observed when the work Op(m) is executed.

(Summary of Process Executed by Information Processing Device)

The process executed by the information processing device 10 (in other words, a control method executed by the information processing device 10) described so far with reference to FIG. 4 may be summarized as follows. That is, the process (control method) executed by the information processing device 10 includes a first acquisition step (S140) of acquiring the basic imaging data BI obtained by the single ceiling camera 30 (wide-area imaging camera) imaging the entire work site WS including the plurality of monitoring regions Ar respectively associated with the plurality of work processes Pr, a worker determination step (S170) of determining whether the worker Pe is present in each of the plurality of monitoring regions Ar through image analysis for the basic imaging data BI acquired in the first acquisition step, a second acquisition step (S110) of acquiring process information generated from the operation results La indicating details and results of the operation Ac executed by the apparatus 40 used to execute each of the plurality of work processes Pr, an apparatus determination step (S130) of determining whether the apparatus 40 is operating by using the process information acquired in the second acquisition step, a generation step (S180) of generating data (association information Mi) in which, for each of the plurality of work processes Pr, (A) a time period (operation period Da) in which the apparatus 40 used to execute the work process Pr is determined as being operating in the apparatus determination step is associated with (B) a time period (stay period Do) in which the worker Pe is determined as being present in the monitoring region Ar associated with the work process Pr in the worker determination step.

According to the above configuration, in the information processing method, it is determined from the basic imaging data BI captured by the single ceiling camera 30 whether the worker Pe is present in the monitoring region Ar associated with the work process Pr. In the information processing method, it is determined from the process information whether the apparatus 40 used to execute the work process Pr is operating. In the information processing method, the association information Mi in which the operation period Da during which the apparatus 40 is determined as being operating is associated with the stay period Do during which the worker Pe is determined as being present in the monitoring region Ar associated with the work process Pr for each work process Pr is generated.

That is, in the information processing method, the association information Mi indicating "a correspondence between the operation period Da during which the apparatus 40 is operating and the stay period Do during which the worker Pe is present in the monitoring region Ar" for each work process Pr is generated through image analysis for the basic imaging data BI obtained by the single ceiling camera 30 imaging the entire work site WS.

Therefore, in the information processing method, it is possible to achieve an effect that a correspondence between an actual operation of the apparatus 40 used for the work process Pr and the worker Pe can be ascertained while suppressing the realization cost by using the single ceiling camera 30 capable of imaging the entire work site WS.

(Calculation of Frequency of Stay Period)

As described above, the worker determination part 120 specifies a time point at which the worker Pe is determined as being now present in the monitoring region Ar in which the worker Pe was determined as not being previously present through the image analysis for the analysis target region Aa as the stay start time Tos. the worker determination part 120 specifies a time point at which the worker Pe is determined as not being now present in the monitoring region Ar in which the worker Pe was determined as being previously present through the image analysis for the analysis target region Aa as the stay end time Toe.

The worker determination part 120 specifies a time from the stay start time Tos(m) to the stay end time Toe(m) for the monitoring region Ar(m) associated with the work process Pr(m) as a time for which the worker Pe was present.

Here, the worker determination part 120 specifies (measures) the stay period Do for each work process Pr (that is, for each monitoring region Ar), and may further calculate the frequency of the stay period Do for each work process Pr (that is, for each monitoring region Ar).

The worker determination part 120 ascertains a time from the stay start time Tos(m) to the stay end time Toe(m) for the monitoring region Ar(m) as "one stay period Do(m)". A time from "a time point (=stay start time Tos(m)(1)) at which it is confirmed that the worker Pe(1) who was not previously present in the monitoring region Ar(m) is now present in the monitoring region Ar(m)" to "a time point (=stay end time Toe(m)(1)) at which it is confirmed that the worker Pe(1) who was previously present in the monitoring region Ar(m) is not now present in the monitoring region Ar(m)" is "one stay period Do(m)(1)".

The worker determination part 120 may set "x+y++z=n" and calculate the number of the stay periods Do(m)(1) of a certain time interval at every time interval out of "n" stay periods Do(m)(1) of the worker Pe(1). For example, the worker determination part 120 confirms that there are "x" stay periods Do(m)(1) of 0 minutes to 4 minutes out of the "n" stay periods Do(m)(1). The worker determination part 120 confirms that there are "y" stay periods Do(m)(1) of 5 minutes to 9 minutes. Similarly, with "p" as an integer of "1" or greater, the worker determination part 120 confirms that there are "z" stay periods Do(m)(1) of "5(p-1)" minutes to "5p-1" minutes.

The worker determination part 120 may calculate the frequency of stay periods Do(m)(1) of 0 minutes to 4 minutes 5, the frequency of the stay periods Do(m)(1) of 5 minutes to 9 minutes, . . . , and the frequency of stay periods Do(m)(1) of "5(p-1)" minutes to "5p-1" minutes for the "n" stay periods Do(m)(1) of the worker Pe(1).

The worker determination part 120 may extract the stay period Do(m) having a frequency lower than a predetermined reference as a "non-standard" stay period Do(m) for the "n" stay periods Do(m), and may notify the estimation part 180 of the extracted "non-standard" stay Do(m). The estimation part 180 may determine that, with respect to the "non-standard" stay period Do extracted by the worker determination part 120, "the work Op performed by the worker Pe during the "non-standard"" stay period Do is not "standard work" (non-standard work).

(Details of Estimation and Determination of Work)

As described above, the estimation part 180 estimates the work details of the "work Op performed by the worker Pe during the stay period Do" by using the association information Mi for each work process Pr generated by the generation part 160, and determines whether the work Op is "standard work". In particular, the estimation part 180 estimates the work details of "the work Op(m) performed by the worker Pe during the stay period Do(m)" by using the determination result of "whether the operation Ac(m) is an "automated operation"" generated by the apparatus determination part 150, and determines whether the work Op is "standard work".

Hereinafter, a process of estimating work details of the "work Op(m) performed by the worker Pe during the stay period Do(m)" executed by the estimation part 180 and a process of determining whether the work Op is standard work will be described in detail.

(1. Work Performed at Operation Start Time)

Before the "apparatus 40(*m*) used to execute the work process Pr(m)" starts to execute the operation Ac(m), generally, it is necessary for the worker Pe to perform work of giving a starting instruction to the apparatus 40(*m*) in order to cause the apparatus 40(*m*) to start the operation Ac(m). That is, at the operation start time Tms(m) at which the apparatus 40(*m*) starts to execute the operation Ac(m), it is generally necessary that the worker Pe is present in the monitoring region Ar(m) associated with the work process Pr(m).

Therefore, when the estimation part 180 confirms, from the association information Mi(m) for the work process Pr(m) generated by the generation part 160, that "the worker Pe was present in the monitoring region Ar(m) at the operation start time Tms(m)", the following estimation and determination are executed. That is, the estimation part 180 estimates that "at the operation start time Tms(m), the worker Pe executed work of giving an instruction for starting the operation Ac(m) to the apparatus 40(*m*)". The work Op(m) performed by the worker Pe present in the monitoring region Ar(m) at the operation start time Tms(m) includes, for example, preparation work for executing the work process Pr(m), starting instruction work such as pressing a start button, and work of checking whether the apparatus 40(*m*) has started the operation Ac(m) smoothly. Work of inputting a set of workpieces to the apparatus 40(*m*) is an example of the preparation work for executing the work process Pr(m). Such work is "normal work performed by the worker Pe before and after the time at which the apparatus 40(*m*) used to execute the work process Pr(m) starts to execute the operation Ac(m)", and is also referred to as "standard work".

That is, when it is confirmed that the stay period Do(m) during which the worker Pe is present in the monitoring region Ar(m) overlaps the operation start time Tms(m), the estimation part 180 estimates that "the work Op(m) performed by the worker Pe during the stay period Do(m) is starting instruction work or the like". The estimation part 180 determines that "the starting instruction work or the like executed by the worker Pe during the stay period Do(m) overlapping the operation start time Tms(m) is standard work".

(2. Work Performed at Operation Completion Time)

After the "apparatus 40(*m*) used to execute the work process Pr(m)" completes the execution of the operation Ac(m), generally, it is necessary for the worker Pe to perform work of giving a completion instruction to the apparatus 40(*m*) in order to cause the apparatus 40(*m*) to complete the operation Ac(m). That is, at the operation completion time Tme(m) at which the apparatus 40(*m*) completes the execution of the operation Ac(m), it is generally necessary that the worker Pe is present in the monitoring region Ar(m) associated with the work process Pr(m).

Therefore, when the estimation part 180 confirms, from the association information Mi(m) for the work process Pr(m) generated by the generation part 160, that "the worker Pe was present in the monitoring region Ar(m) at the operation completion time Tme(m)", the following estimation and determination are executed. That is, the estimation part 180 estimates that "at the operation completion time Tme(m), the worker Pe executed work of giving an instruction for completing the operation Ac(m) to the apparatus 40(*m*)". The work Op(m) performed by the worker Pe present in the monitoring region Ar(m) at the operation completion time Tme(m) includes, for example, completion instruction work such as pressing an end button, post-work after the completion of the work process Pr(m), and work of checking whether the apparatus 40(*m*) has completed the operation Ac(m) smoothly. Work of collecting a workpiece for which the work process Pr(m) has been completed, that is, a workpiece for which the operation Ac(m) by the apparatus 40(*m*) used to execute the work process Pr(m) has been completed is an example of post-work after the completion of the work process Pr(m). Such work is "normal work performed by the worker Pe before and after the time at which the apparatus 40(*m*) used to execute the work process Pr(m) completes the execution of the operation Ac(m)", and is also referred to as "standard work".

That is, when it is confirmed that the stay period Do(m) during which the worker Pe is present in the monitoring region Ar(m) overlaps the operation completion time Tme (m), the estimation part 180 estimates that "the work Op(m) performed by the worker Pe during the stay period Do(m) is completion instruction work or the like". The estimation part 180 determines that "the completion instruction work or the like executed by the worker Pe during the stay period Do(m) overlapping the operation completion time Tme(m) is standard work".

(3. Work Performed at Time at which Operation is not Executed)

It is assumed that, after the "apparatus 40(*m*) used to execute the work process Pr(m)" completes the "p"-th execution of the operation Ac(m) and before the "p+1"-th execution is started, the worker Pe behaves as follows. That is, it is assumed that the worker Pe stops at the monitoring region Ar(m), executes setup work for starting the "p+1"-th execution, and after that work, once leaves the monitoring region Ar(m), and then returns to the monitoring region Ar(m) for a while, and starts the "p+1"-th execution.

Therefore, when the estimation part 180 confirms that the stay period Do(m) is present between the operation completion time Tme(m)(p) of the "p"-th operation Ac(m) and the operation start time Tms(m)(p+1) of the "p+1"-th operation Ac(m) on the basis of the association information Mi(m) for the work process Pr(m) generated by the generation part 160, the following estimation and determination are executed. That is, the estimation part 180 estimates that "the worker Pe was executing the setup work or the like during the stay period Do(m) between the operation completion time Tme(m)(p) and the operation start time Tms(m)(p+1)". Since the setup work or the like is "normal work performed by the worker Pe between the operation completion time Tme(m)(p) and the operation start time Tms(m)(p+1)", the estimation part 180 determines that the "setup work or the like is standard work".

In other words, the estimation part 180 executes the following estimation for the stay period Do(m) that does not overlap the operation period Da(m) of the apparatus 40(*m*) and in which operation period Da(m) appears within a predetermined time after the end of the stay period Do(m). That is, the estimation part 180 estimates that "the worker Pe was executing the setup work or the like during such a stay period Do(m)", and determines that "the work Op(m) performed by the worker Pe during such a stay period Do(m) is standard work".

(4. Work Performed while Operation is being Executed)

The estimation part 180 estimates work details of the work Op(m) performed by the worker Pe present in the monitoring region Ar(m) while the "apparatus 40(*m*) used to execute the work process Pr(m)" was executing the operation Ac(m), and determines whether the work Op is standard work. In particular, the estimation part 180 estimates the work details of the work Op(m) of the worker Pe "present in the monitoring region Ar(m) during the operation period Da(m) of the operation Ac(m)" by using the determination result of "whether the operation Ac(m) is an "automated operation"" reported from the apparatus determination part 150, and determines whether the work Op is standard work.

(4-1. Acquisition of determination Result of whether Operation is Automated Operation)

First, the estimation part 180 acquires a determination result of "whether the operation Ac(m) executed by the apparatus 40(*m*) when the work process Pr(m) is executed is an "automated operation"" from the apparatus determination part 150.

Here, the "automated operation" is the operation Ac(m) executed by the apparatus 40(*m*) when the work process Pr(m) is executed, and is the operation Ac(m) having the following properties. That is, the "automated operation" is the operation Ac(m) that typically does not require "additional work Op(m) by the worker Pe during the execution of the operation(m) by the apparatus 40(*m*), that is, during the operation period Da(m)".

For example, an "automated inspection operation" typically does not require additional work Op(m) by the worker Pe from the start of the "automated inspection operation" by the apparatus 40(*m*) that is an automatic inspection machine to the completion of the "automated inspection operation". That is, the "automated inspection operation" typically does not require an additional work Op(m) by the worker Pe from the start of the execution to the completion of the execution, that is, typically does not require the additional work Op(m) by the worker Pe during the operation period Da(m) of the "automated inspection operation". Therefore, the "automated inspection operation" is an "automated operation".

On the other hand, the operation Ac(m) that is the "operation Ac(m) executed by the apparatus 40(*m*) when the work process Pr(m) is executed" and is not an "automated operation" is also referred to as a "non-automated operation" or a "manual operation", that is, an "unautomated operation". The "unautomated operation" is the operation Ac(m) executed by the apparatus 40(*m*) when the work process Pr(m) is executed, and is the operation Ac(m) having the following properties. That is, the "unautomated operation" is the operation Ac(m) that "typically requires the additional work Op(m)" by the worker Pe during the execution of the operation(m) by the apparatus 40(*m*), that is, during the operation period Da(m).

For example, an "assembly assistance operation" is the operation Ac(m) that assists with the assembly work Op(m) by the worker Pe, and requires the assembly work Op(m) by the worker Pe after the apparatus 40(*m*) starts the "assembly assistance operation" until the "assembly assistance operation" is completed. That is, the "assembly assistance operation" typically requires the additional work Op(m) by the worker Pe from the start of execution to the completion of execution, that is, typically requires the additional work Op(m) by the worker Pe during the operation period Da(m) of the "assembly assistance operation". Therefore, the "assembly assistance operation" is an "unautomated operation".

(4-2. Work Performed during Execution of Automated Operation)

When the operation Ac(m) executed by the apparatus 40(*m*) when the work process Pr(m) is executed is an "automated operation", the estimation part 180 checks whether the operation period Da(m) and the stay period Do do not overlap each other for a predetermined time or more.

As described above, the operation Ac(m) that is an "automated operation" "typically does not require the additional work Op(m) by the worker Pe during the operation period Da(m)", and thus the operation period Da(m) and the stay period Do(m) typically do not overlap each other for a predetermined time or more.

Therefore, when it is confirmed that the operation period Da(m) and the stay period Do(m) overlap each other for a predetermined time or more in the association information Mi(m) for the work process Pr(m), the estimation part 180 determines that "an atypical situation has occurred when the work process Pr(m) is executed". That is, when it is confirmed that the stay period Do(m) overlaps the operation period Da(m) of the operation Ac(m) that is an "automated operation" for a predetermined time or more, the estimation part 180 determines that "the work Op(m) performed by the worker Pe during the stay period Do(m) is non-standard work".

For example, if the operation period Da(m) of the operation Ac(m) that is an "automated operation" overlaps a short stay period Do(m) for a predetermined time or more, the estimation part 180 performs the following determination regarding the work Op(m) performed by the worker Pe during the stay period Do(m). That is, the estimation part 180 estimates that "the worker Pe is executing maintenance work or repair work on the apparatus 40(*m*)", and determines that "the worker Pe performed by the worker Pe during the stay period Do(m) is non-standard work".

For example, if the operation period Da(m) of the operation Ac(m) that is an "automated operation" overlaps a long stay period Do(m) for a predetermined time or more, the estimation part 180 performs the following determination regarding the work Op(m) performed by the worker Pe during the stay period Do(m). That is, the estimation part 180 estimates that "the worker Pe may be wasting time until the operation Ac(m) that is an "automated operation" is completed" and determines that "the work Op(m) performed by the worker Pe during the stay period Do(m) is non-standard work".

(4-3. Work Performed During Execution of Unautomated Operation)

When the operation Ac(m) executed by the apparatus 40(*m*) when the work process Pr(m) is executed is an "unautomated operation", the estimation part 180 checks whether the operation period Da(m) of the operation Ac(m) always overlaps the stay period Do(m).

As described above, the operation Ac(m) that is an "unautomated operation" "typically requires the additional work Op(m) by the worker Pe during the operation period Da(m)", and thus it is typical that the operation period Da(m) always overlaps the stay period Do(m).

Therefore, when it is confirmed that the operation period Da(m) that does not overlap the stay period Do(m) is present in the association information Mi(m) for the work process Pr(m), the estimation part 180 determines that "an atypical situation has occurred in the operation period Da(m) that does not overlap the stay period Do(m)". That is, when it is confirmed that there is the operation period Da(m) that does not overlap the stay period Do(m), the estimation part 180 determines that "the work Op(m) performed by the worker Pe during the stay period Do(m) before and after the operation period Da(m)" is "non-standard work".

For example, in the operation period Da(m) of the operation Ac(m) that is an "unautomated operation", which does not overlap the stay period Do(m), the operation Ac(m) that is required to be executed originally may be interrupted for some reason.

(5. Summary of Estimation and Determination of Work)

As described above, the estimation part 180 estimates "what kind of work Op was executed by the worker Pe during the stay period Do(m)" by using the association information Mi(m) for the work process Pr(m). The estimation part 180 determines whether the estimated work Op(m) is standard work executed when the work process Pr(m) is executed.

That is, the estimation part 180 specifies the operation start time Tms(m), the operation completion time Tme(m), and the operation period Da(m) of the apparatus 40(*m*) by using the association information Mi(m) for the work process Pr(m). The estimation part 180 checks whether each of the specified operation start time Tms, operation completion time Tme, and operation period Da overlaps the stay period Do, and executes estimation and determination of the work Op performed by the worker Pe during the stay period Do on the basis of a check result.

The estimation part 180 acquires the details of the operation Ac(m) of the apparatus 40(*m*) during the operation period Da(m), specifically, the determination result of whether the operation Ac(m) executed by the apparatus 40(*m*) during the operation period Da(m) is an "automated operation" from the apparatus determination part 150. When it is confirmed that there is the stay period Do that overlaps the operation period Da for a predetermined time or more, the estimation part 180 executes estimation and determination of the work Op performed by the worker Pe during the stay period Do by using the details of the operation Ac of the apparatus 40 in the operation period Da. That is, the estimation part 180 estimates the work details of the work Op during the "stay period Do that overlaps the operation period Da for a predetermined time or more" by using the details of the operation Ac (a result of determining whether the operation Ac is an "automated operation"), and determines whether the work Op is standard work.

Here, regarding the "work Op performed by the worker Pe during the stay period Do", there may be the work Op that cannot be determined as being "standard work" or "non-standard work" by estimating details of the work Op depending on the estimation method or the determination method described above. The estimation part 180 may determine that the work Op that cannot be determined as being "standard work" or "non-standard work" in the above determination method is "non-standard work".

(Specific Example of Estimation and Determination of Work Details)

Figure 5:
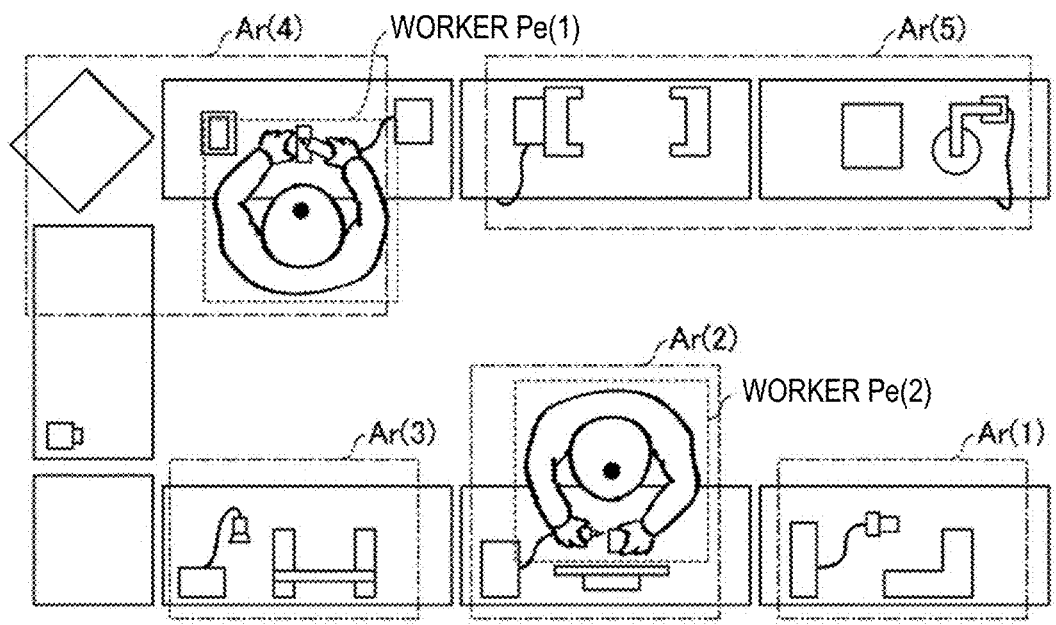
FIG. 5 is a diagram illustrating a method in which the information processing device in FIG. 1 uses the basic imaging data (images) to specify a worker and a monitoring region.

FIG. 5 is a diagram illustrating a method in which the worker determination part 120 specifies the worker Pe and the monitoring region Ar by using the basic imaging data BI. As illustrated in FIG. 5, the worker determination part 120 determines whether the worker Pe is present in each of the plurality of monitoring regions Ar respectively corresponding to the plurality of work processes Pr through image analysis for the basic imaging data BI. For the monitoring region Ar in which the worker Pe is determined as being present, a worker ID of the worker Pe present in the monitoring region Ar is specified.

In the example illustrated in FIG. 5, the worker determination part 120 executes the following determination through image analysis for the basic imaging data BI, particularly through image analysis for a plurality of analysis target regions Aa. That is, the worker determination part 120 determines that the workers Pe are present in the monitoring region Ar(2) and the monitoring region Ar(4) among the monitoring region Ar(1) to the monitoring region Ar(5). The worker determination part 120 specifies that a worker ID of the worker Pe present in the monitoring region Ar(2) is a "worker Pe(2)" and a worker ID of the worker Pe present in the monitoring region Ar(4) is a "worker Pe(1)".

Figure 6:
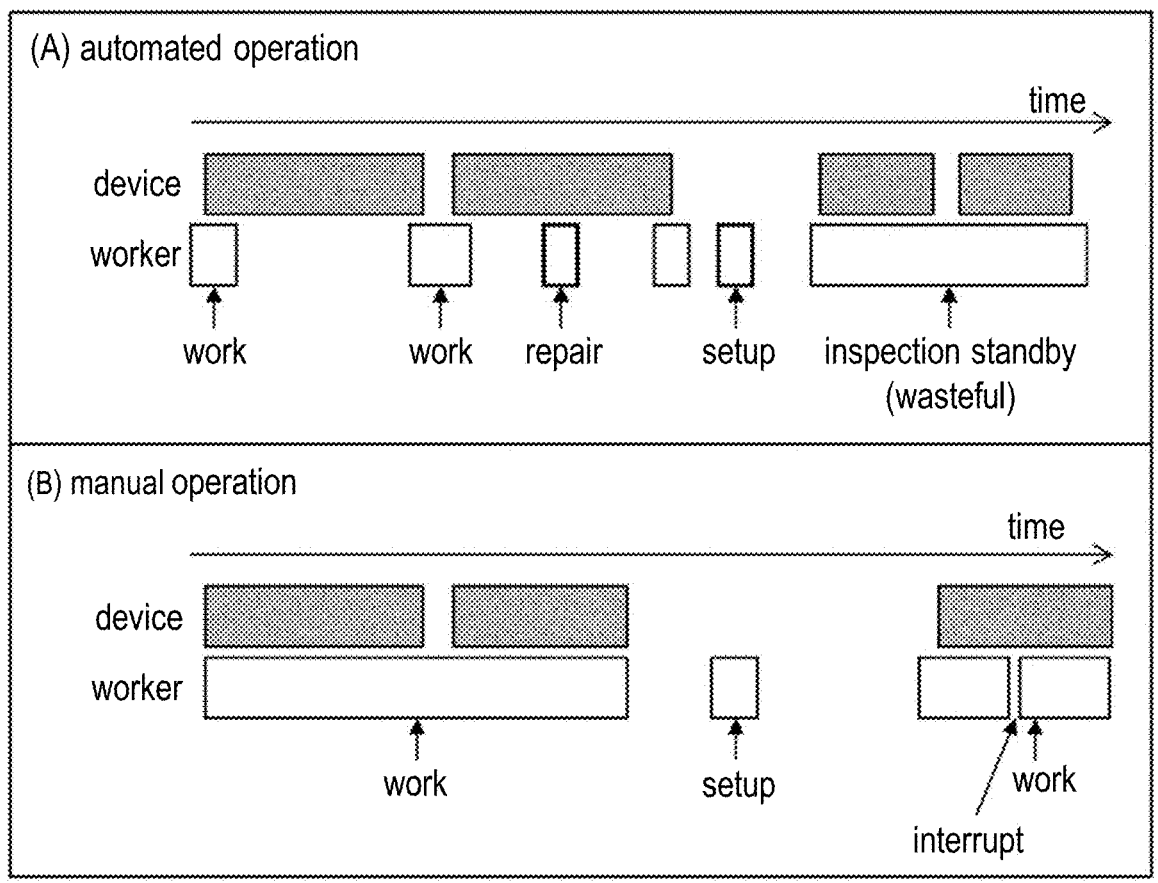
FIG. 6 is a diagram illustrating an example of information indicating a correspondence between an operation period of an apparatus and a stay period of a worker for each work process.

FIG. 6 is a diagram illustrating an example of the association information Mi generated by the generation part 160, in which "the operation period Da is associated with the stay period Do for each work process Pr". The generation part 160 generates the association information Mi(m) by using the "stay period Do(m)(x) of the worker Pe(x) for the work process Pr(m)" acquired from the worker determination part 120 and the "operation period Da(m) of the operation Ac(m) for the work process Pr(m)" acquired from the apparatus determination part 150. In the association information Mi(m) illustrated in FIG. 6, "the stay period Do(m) of the worker Pe for the work process Pr(m)" and "the operation period Da(m) of operation Ac(m) for the work process Pr(m)" are associated with each other with a common time axis.

The estimation part 180 may distinguish whether the operation Ac(m) executed during the operation period Da(m) is an "automated operation", and generate information in which the stay period Do(m) is associated with the operation period Da(m). As described above, by distinguishing whether the operation Ac(m) is an "automated operation", the estimation part 180 can more precisely determine whether the work Op(m) performed by the worker Pe during the stay period Do(m) is "standard work".

(A) of FIG. 6 illustrates an example of a result of estimation executed by the estimation part 180 for the "work Op(m) performed by worker Pe during the stay period Do(m)" in a case where the operation Ac(m) is an "automated operation".

In (A) of FIG. 6, the estimation part 180 determines that the work Op(m) performed by the worker Pe during the stay period Do(m) overlapping the operation start time Tms(m) is "standard work" such as starting instruction work. The estimation part 180 determines that the work Op(m) performed by the worker Pe during the stay period Do(m) overlapping the operation completion time Tme(m) is "standard work" such as completion instruction work. The estimation part 180 determines that the work Op performed by the worker Pe during the stay period Do(m) that does not overlap the operation period Da(m) and in which the operation period Da(m) appears within a predetermined time after the end of the stay period Do(m) is "standard work" such as setup work.

If the operation period Da(m) of the operation Ac(m) that is an "automated operation" overlaps a short stay period Do(m) for a predetermined time or more, the estimation part 180 determines that "the work Op(m) is non-standard work such as repair work".

If the operation period Da(m) of the operation Ac(m) that is an "automated operation" overlaps a long stay period Do(m) for a predetermined time or more, the estimation part 180 determines that "the work Op(m) is non-standard work such as inspection standby".

(B) of FIG. 6 illustrates an example of a result of estimation executed by the estimation part 180 for the "work Op(m) performed by worker Pe during the stay period Do(m)" in a case where the operation Ac(m) is an "unautomated operation (that is, a manual operation)". The estimation part 180 determines that the work Op(m) performed by the worker Pe during the stay period Do(m) overlapping at least one of the operation start time Tms(m) and the operation completion time Tme(m) is "standard work" such as starting instruction work or completion instruction work. The estimation part 180 determines that the work Op performed by the worker Pe during the stay period Do(m) that does not overlap the operation period Da(m) and in which the operation period Da(m) appears within a predetermined time after the end of the stay period Do(m) is "standard work" such as setup work.

When it is confirmed that the operation period Da(m) of the operation Ac(m) that is an "unautomated operation" is interrupted during the stay period Do(m), the estimation part 180 determines that "the work Op performed by the worker Pe during stay period Do(m) is non-standard work".

Figure 7:
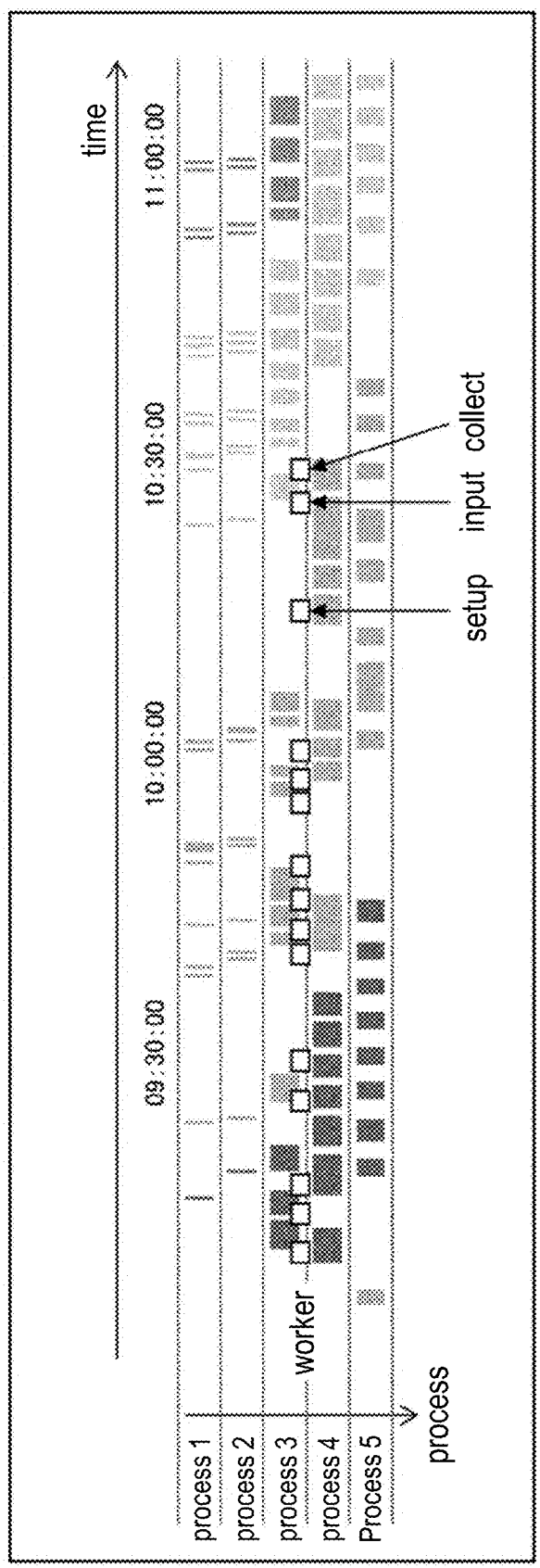
FIG. 7 illustrates an example of a screen indicating the correspondence between the operation period of an apparatus and the stay period of a worker for a plurality of work processes in a list form.

FIG. 7 illustrates a screen example indicating a correspondence between the operation period Da and the stay period Do in a list form for a plurality of work processes Pr. As illustrated in FIG. 7, the information processing device 10 may display the correspondence between the operation period Da and the stay period Do in a list form, for example, on an external display device (the external device 70 or the like in FIG. 2) for a plurality of work processes Pr. By displaying the correspondence between the operation period Da and the stay period Do in a list form for a plurality of work processes Pr, the information processing device 10 allows a user to find the work process Pr that is a bottleneck and easily examine improvement thereof.

Figure 8:
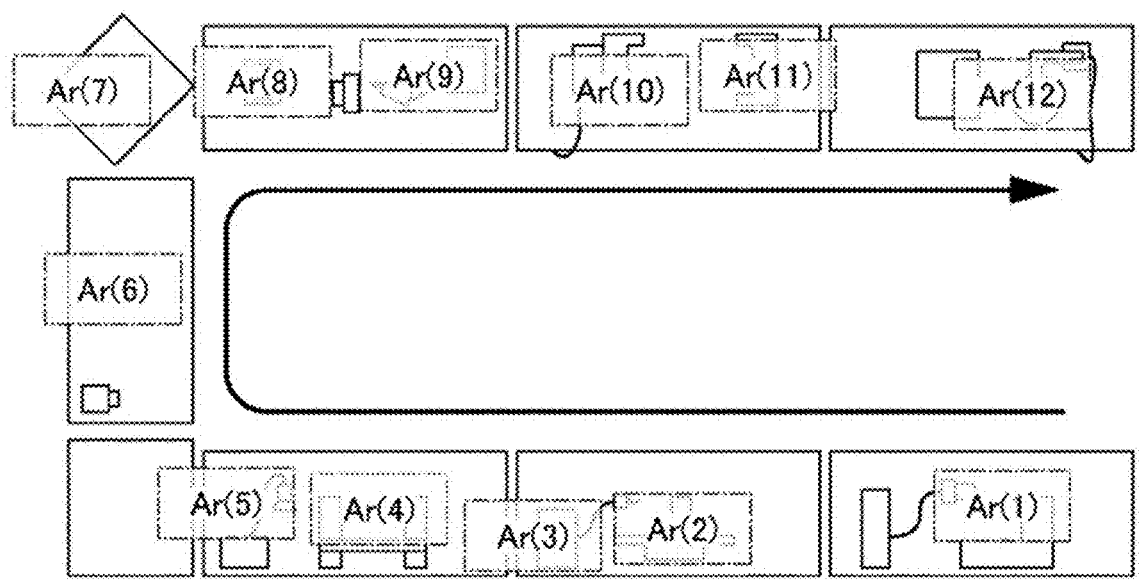
FIG. 8 is a diagram illustrating an example of a work site in which a plurality of monitoring regions is disposed in correspondence with an execution order of a plurality of work processes.

FIG. 8 is a diagram illustrating an example of the work site WS in which a plurality of monitoring regions Ar is disposed in correspondence with an execution order of a plurality of work processes Pr. The generation part 160 or the estimation part 180 may generate information indicating the movement progress of the worker Pe at the work site WS through image analysis for the basic imaging data BI, in particular, through image analysis for each of the plurality of analysis target regions Aa corresponding to the plurality of work processes Pr. Such information indicating the movement progress of the worker Pe is particularly useful for finding work process Pr that is a bottleneck and examining improvement thereof for the work site WS in which the plurality of monitoring regions Ar is disposed in correspondence with the execution order of the plurality of work processes Pr.

Figure 9:
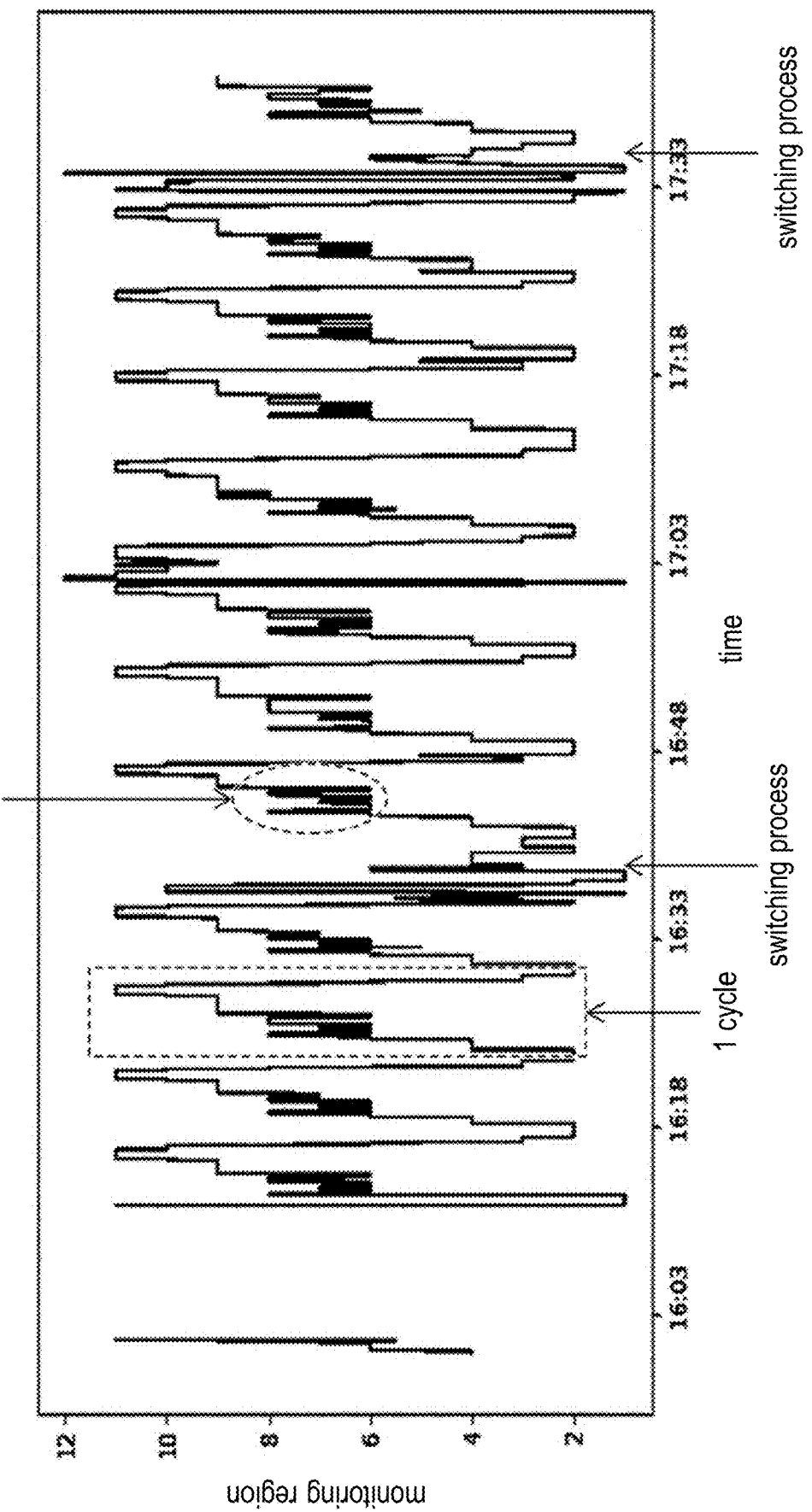
FIG. 9 is a diagram illustrating an example of information indicating movement progress of a worker at a work site.

FIG. 9 is a diagram illustrating an example of information indicating the movement progress of the worker Pe at the work site WS, generated by the generation part 160 through image analysis for the basic imaging data BI. With the "information indicating the movement progress of the worker Pe at the work site WS" as illustrated in FIG. 9, the user may execute the following examination, for example.

That is, the user confirms that the worker Pe repeatedly moves from the monitoring region Ar(6) to the monitoring region Ar(7), from the monitoring region Ar(7) to the monitoring region Ar(8), from the monitoring region Ar(8) to the monitoring region Ar(7), and from the monitoring region Ar(7) to the monitoring region Ar(6). In a case where the monitoring region Ar(6) corresponds to the work process Pr(6): inspection process, the user may estimate the following situation, for example, from the "information indicating the movement progress of the worker Pe at the work site WS" illustrated in FIG. 9. That is, a situation may be estimated in which, in the waiting time generated in the inspection process or the like, the worker Pe is executing the work Op(7) and the work Op(8) in the work process Pr(7) and the work process Pr(8) in parallel to the work Op(6): inspection work in the inspection process.

As illustrated in FIG. 9, the user may specify a plurality of work processes Pr forming "1 cycle" from the "information indicating the movement progress of the worker Pe at the work site WS", for example, in a case where the same movement progress occurs repeatedly. Similarly, the user may specify a "(cycle) switching process" from the movement progress of the worker Pe between cycles.

4. MODIFICATION EXAMPLE (Integrate Information Processing Device with PLC)

So far, as illustrated in FIG. 2, an example in which the information processing device 10 and the PLC 20 are communicatively connected to each other via the control network 50 has been described. However, it is not essential to connect the information processing device 10 to the PLC 20 via the control network 50.

For example, the information processing device 10 and the PLC 20 may be communicatively connected to each other via an internal bus, or the information processing device 10 and the PLC 20 may be integrated. That is, the information processing device 10 may be configured as an industrial PC (IPC) in which the information processing device 10 and the PLC 20 are integrated.

(Analysis of Process Information by PLC)

In the description so far, the information processing device 10 that has received the process information from the PLC 20 executes the apparatus determination process for the operation results La (particularly, the operation Ac) included in the process information. That is, in the examples described so far, the apparatus determination part 150 included in the information processing device 10 calculates the operation start time Tms, the operation completion time Tme, and the operation period Da of the operation Ac from the operation results La, and determines whether the operation Ac is an "automated operation".

However, the PLC 20 may execute the apparatus determination process for the operation results La (particularly, the operation Ac) included in the process information, and the PLC 20 may cause a result of the apparatus determination process to be included in the process information or instead of the process information and transmit the result to the information processing device 10. For example, the apparatus determination part 150 may be provided in the PLC 20, and the information processing device 10 may acquire the result of the apparatus determination process for the operation results La (particularly, the operation Ac) included in the process information from the PLC 20. The information processing device 10 only needs to be able to generate the association information Mi for each work process Pr by using the result of the apparatus determination process for the operation results La (particularly, the operation Ac) included in the process information, and it is not essential that the information processing device 10 executes the apparatus determination process for the operation results La.

[Example of Realization by Software]

The functional blocks of the information processing device 10 (specifically, the first acquisition part 110, the worker determination part 120, the second acquisition part 140, the apparatus determination part 150, the generation part 160, the display control part 170, the estimation part 180, and the region setting part 190) may be realized by a logic circuit (hardware) formed in an integrated circuit (IC chip) or the like, or may be realized by software by using a central processing unit (CPU).

In the latter case, the information processing device 10 includes a CPU that executes instructions of a program that is software that realizes each function, and a read only memory (ROM) in which the program and various data are readably recorded by a computer (or CPU) or a storage device (referred to as a "recording medium"), a random access memory (RAM) to which the above program is loaded, and the like. The objective of the present invention is achieved by the computer (or the CPU) reading the program from the recording medium and executing the program. As the recording medium, a "non-transitory tangible medium", for example, a tape, a disk, a card, a semiconductor memory, or a programmable logic circuit may be used. The program may be supplied to the computer via any transmission medium (for example, a communication network or a broadcast wave) capable of transmitting the program. The present invention may also be realized in the form of a data signal embedded in a carrier wave, in which the above program is embodied by electronic transmission.

APPENDIX

An information processing device according to an aspect of the present invention includes a first acquisition part that acquires imaging data obtained by a single wide-area imaging camera imaging an entire work site including a plurality of monitoring regions respectively associated with a plurality of work processes; a worker determination part that determines whether a worker is present in each of the plurality of monitoring regions through image analysis for the imaging data acquired by the first acquisition part; a second acquisition part that acquires process information generated from operation results indicating details and results of an operation executed by an apparatus used to execute each of the plurality of work processes; an apparatus determination part that determines whether the apparatus is operating by using the process information acquired by the second acquisition part; and a generation part that generates, for each of the plurality of work processes, data in which (A) a time period during which the apparatus used to execute the work process is determined as being operating by the apparatus determination part is associated with (B) a time period during which the worker is determined as being present in the monitoring region associated with the work process by the worker determination part.

According to the above configuration, the information processing device determines whether the worker is present in the monitoring region associated with the work process on the basis of the imaging data captured by the single wide-area imaging camera, and also determines whether the apparatus used to execute the work process is operating on the basis of the process information. The information processing device generates the data in which the time period during which the apparatus is determined as being operating is associated with the time period during which the worker is determined as being present in the monitoring region associated with the work process for each work process.

That is, the information processing device generates the data indicating a "correspondence between the time period during which the apparatus is operating and the time period during which the worker Pe is present in the monitoring region" for each work process through image analysis for the imaging data obtained by the single wide-area imaging camera imaging the entire work site.

Therefore, the information processing device can achieve an effect of suppressing the realization cost and also ascertaining a correspondence between an actual operation of the apparatus used for the work process and the worker by using the single wide-area imaging camera capable of imaging the entire work site.

The information processing device according to the aspect of the present invention may further include an estimation part that estimates details of work performed by the worker in the time period during which the worker is determined as being present in the monitoring region associated with the work process by the worker determination part, by using the operation results of the apparatus used to execute the work process.

According to the above configuration, the information processing device estimates details of the work performed by the worker in the time period during which the worker is determined as being present in the monitoring region associated with the work process by using the operation results of the apparatus used to execute the work process.

Therefore, the information processing device can achieve an effect of estimating details of the work performed by the worker Pe present in the monitoring region associated with the work process by using the operation results of the apparatus for each work process.

The information processing device according to the aspect of the present invention may further include a display control part that generates data in which a Gantt chart indicating the time period during which the apparatus used to execute the work process is determined as being operating by the apparatus determination part and a Gantt chart indicating the time period during which the worker is determined as being present in the monitoring region associated with the work process by the worker determination part are displayable in parallel.

According to the above configuration, the information processing device generates the data in which the Gantt chart indicating the time period during which the apparatus is determined as being operating and the Gantt chart indicating the time period during which the worker is determined as being present in the monitoring region for each work process are displayable in parallel.

Therefore, the information processing device can achieve an effect that a correspondence between the operation time of the apparatus and the time for which the worker is present in the monitoring region for each work process can be displayed to an administrator or the like in a form that can be ascertained at a glance.

The information processing device according to the aspect of the present invention may further include a region setting part that sets an analysis target region that is an image analysis target with the monitoring region as an imaged region for the imaging data according to a user operation.

According to the above configuration, the information processing device sets the analysis target region for the imaged data according to the user operation. Therefore, the information processing device can achieve an effect that the analysis target region can be set for the imaging data according to the user operation.

A control method for an information processing device according to another aspect of the present invention includes a first acquisition step of acquiring imaging data obtained by a single wide-area imaging camera imaging an entire work site including a plurality of monitoring regions respectively associated with a plurality of work processes; a worker determination step of determining whether a worker is present in each of the plurality of monitoring regions through image analysis for the imaging data acquired in the first acquisition step; a second acquisition step of acquiring process information generated from operation results indicating details and results of an operation executed by an apparatus used to execute each of the plurality of work processes; an apparatus determination step of determining whether the apparatus is operating by using the process information acquired in the second acquisition step; and a generation step of generating, for each of the plurality of work processes, data in which (A) a time period during which the apparatus used to execute the work process is determined as being operating in the apparatus determination step is associated with (B) a time period during which the worker is determined as being present in the monitoring region associated with the work process in the worker determination step.

According to the above configuration, in the information processing method, it is determined whether the worker is present in the monitoring region associated with the work process on the basis of the imaging data captured by the single wide-area imaging camera, and it is also determined whether the apparatus used to execute the work process is operating on the basis of the process information. In the information processing method, the data in which the time period during which the apparatus is determined as being operating is associated with the time period during which the worker is determined as being present in the monitoring region associated with the work process is generated for each work process.

That is, in the information processing method, the data indicating a "correspondence between the time period during which the apparatus is operating and the time period during which the worker Pe is present in the monitoring region" is generated for each work process through image analysis for the imaging data obtained by the single wide-area imaging camera imaging the entire work site.

Therefore, the information processing method can achieve an effect of suppressing the realization cost and also ascertaining a correspondence between an actual operation of the apparatus used for the work process and the worker by using the single wide-area imaging camera capable of imaging the entire work site.

The present invention is not limited to each of the above-described embodiments, and various modifications can be made within the scope of the claims, and embodiments obtained by appropriately combining the technical means disclosed in the different embodiments are also included in the technical scope of the present invention.

What is claimed is:

1. An information processing device comprising a processor, configured to:
   acquire imaging data obtained by a single wide-area imaging camera imaging an entire work site including a plurality of monitoring regions respectively associated with a plurality of work processes;
   determine whether a worker is present in each of the plurality of monitoring regions through image analysis for the imaging data which has been acquired;
   acquire process information generated from operation results indicating details and results of an operation executed by an apparatus used to execute each of the plurality of work processes;
   determine whether the apparatus is operating by using the process information which has been acquired;
   generate, for each of the plurality of work processes, data in which (A) a time period during which the apparatus has executed the operation corresponding to a work process for each of the plurality work processes is determined based on the process information is associated with (B) a time period during which the worker is determined as being present in the monitoring region associated with the work process based on the imaging data, wherein the data comprises association information indicating a correspondence between (A) the time period during which the apparatus has executed the operation corresponding to the work process for each of the plurality work processes and (B) the time period during which the worker is determined as being present in the monitoring region associated with the work process;
   specify at least one of the work processes as a bottleneck based on the association information indicating an overlap between the time period during which the apparatus has executed the operation corresponding to the work process for each of the plurality work processes and the time period during which the worker is determined as being present in the monitoring region associated with the work process exceeding a predetermined time period;
   display a first Gantt chart indicating the time period during which the apparatus has executed the operation corresponding to the work process for each of the plurality of work processes;
   display a second Gantt chart indicating the time period during which the worker is determined as being present in the monitoring region associated with the work process, wherein the first Gantt chart and the second Gantt chart are displayed in parallel; and
   display the imaging data combined with at least one work process specified as the bottleneck.

2. The information processing device according to claim 1, further comprising the processor, configured to:
   estimate details of work performed by the worker in the time period during which the worker is determined as being present in the monitoring region associated with the work process, by using the operation results of the apparatus used to execute the work process.

3. The information processing device according to claim 1, further comprising the processor, configured to:
   set an analysis target region that is an image analysis target with the monitoring region as an imaged region for the imaging data according to a user operation.

4. An information processing method comprising:
   a first acquisition step of acquiring imaging data obtained by a single wide-area imaging camera imaging an entire work site including a plurality of monitoring regions respectively associated with a plurality of work processes;
   a worker determination step of determining whether a worker is present in each of the plurality of monitoring regions through image analysis for the imaging data acquired in the first acquisition step;
   a second acquisition step of acquiring process information generated from operation results indicating details and results of an operation executed by an apparatus used to execute each of the plurality of work processes;
   an apparatus determination step of determining whether the apparatus is operating by using the process information acquired in the second acquisition step;
   a generation step of generating, for each of the plurality of work processes, data in which (A) a time period during which the apparatus has executed the operation corresponding to a work process for each of the plurality work is determined as being operating in the apparatus determination step is associated with (B) a time period during which the worker is determined as being present in the monitoring region associated with the work process in the worker determination step, wherein the data comprises association information indicating a correspondence between (A) the time period during which the apparatus has executed the operation corresponding to the work process for each of the plurality work processes and (B) the time period during which the worker is determined as being present in the monitoring region associated with the work process;
   a specifying step of specifying at least one of the work processes as a bottleneck based on the association information indicating an overlap between the time period during which the apparatus has executed the operation corresponding to the work process for each of the plurality work processes and the time period during which the worker is determined as being present in the monitoring region associated with the work process exceeding a predetermined time period;
   a first displaying step of displaying a first Gantt chart indicating the time period during which the apparatus has executed the operation corresponding to the work process for each of the plurality of work processes;
   a second displaying step of displaying a second Gantt chart indicating the time period during which the worker is determined as being present in the monitoring region associated with the work process, wherein the first Gantt chart and the second Gantt chart are displayed in parallel; and a third displaying step of displaying the imaging data combined with at least one work process specified as the bottleneck.

5. A non-transitory computer-readable recording medium, recording an information processing program for causing a computer to:
acquire imaging data obtained by a single wide-area imaging camera imaging an entire work site including a plurality of monitoring regions respectively associated with a plurality of work processes;
determine whether a worker is present in each of the plurality of monitoring regions through image analysis for the imaging data which has been acquired;
acquire process information generated from operation results indicating details and results of an operation executed by an apparatus used to execute each of the plurality of work processes;
determine whether the apparatus is operating by using the process information which has been acquired; and
generate, for each of the plurality of work processes, data in which (A) a time period during which the apparatus has executed the operation corresponding to a work process for each of the plurality work processes is determined based on the process information is associated with (B) a time period during which the worker is determined as being present in the monitoring region associated with the work process based on the imaging data, wherein the data comprises association information indicating a correspondence between (A) the time period during which the apparatus has executed the operation corresponding to the work process for each of the plurality work and (B) the time period during which the worker is determined as being present in the monitoring region associated with the work process;
specify at least one of the work processes as a bottleneck based on the association information indicating an overlap between the time period during which the apparatus has executed the operation corresponding to the work process for each of the plurality work processes and the time period during which the worker is determined as being present in the monitoring region associated with the work process exceeding a predetermined time period;
display a first Gantt chart indicating the time period during which the apparatus has executed the operation corresponding to the work process for each of the plurality of work processes; and
display a second Gantt chart indicating the time period during which the worker is determined as being present in the monitoring region associated with the work process, wherein the first Gantt chart and the second Gantt chart are displayed in parallel; and
display the imaging data combined with at least one work process specified as the bottleneck.

* * * * *